(12) United States Patent
Saito

(10) Patent No.: US 11,014,009 B2
(45) Date of Patent: May 25, 2021

(54) PROGRAM, INFORMATION PROCESSING DEVICE, AND CONTROL METHOD

(71) Applicant: GREE, Inc., Tokyo (JP)

(72) Inventor: Jun Saito, Tokyo (JP)

(73) Assignee: GREE, Inc., Tokyo (JP)

( * ) Notice: Subject to any disclaimer, the term of this patent is extended or adjusted under 35 U.S.C. 154(b) by 335 days.

(21) Appl. No.: 16/048,545

(22) Filed: Jul. 30, 2018

(65) Prior Publication Data
US 2019/0030440 A1     Jan. 31, 2019

(30) Foreign Application Priority Data

Jul. 31, 2017   (JP) .............................. JP2017-148401

(51) Int. Cl.
*A63F 13/847*    (2014.01)
*A63F 13/35*    (2014.01)
*A63F 13/69*    (2014.01)

(52) U.S. Cl.
CPC ............ *A63F 13/847* (2014.09); *A63F 13/35* (2014.09); *A63F 13/69* (2014.09)

(58) Field of Classification Search
None
See application file for complete search history.

(56) References Cited

U.S. PATENT DOCUMENTS 9,352,217 B1 *   5/2016   Curtis .................... A63F 13/792
9,776,089 B1 *   10/2017   Curtis .................... A63F 13/792
2013/0143669 A1 *   6/2013   Muller .................... A63F 13/45
                                                                463/42
2016/0184706 A1 *   6/2016   Muller .................... A63F 13/35
                                                                 463/42
2017/0173469 A1 *   6/2017   Fujisawa ................. A63F 13/45
2017/0361228 A1 *   12/2017   Muller ................... A63F 13/795

FOREIGN PATENT DOCUMENTS

| JP | 2013-223594 A | 10/2013 |
|----|---------------|---------|
| JP | 2017-035451 A | 2/2017 |
| JP | 2017-108817 A | 6/2017 |
| JP | 2017-119089 A | 7/2017 |

OTHER PUBLICATIONS

Office Action dated Jan. 12, 2021 in corresponding Japanese application No. 2017-148401; 5 pgs.

* cited by examiner

*Primary Examiner* — Jay Trent Liddle
*Assistant Examiner* — Alex P. Rada, II
(74) *Attorney, Agent, or Firm* — Maier & Maier, PLLC

(57) ABSTRACT

A game may be provided which is capable of allowing a user to continuously play a game by allowing users to cooperate with each other on the basis of owned game media. A game program for running the game may include a game medium storage function, an extraction function, an extracted user storage function, a fluctuation determination function, a processing function, and a parameter value storage function. The processing function allows a parameter value of a corresponding game medium to automatically vary on the basis of a result of the determination by the fluctuation determination function.

21 Claims, 15 Drawing Sheets

FIG.3

| USER ID | PASSWORD | NAME | OWNED CARD INFORMATION (OWN ID, CARD ID) | USER LEVEL | ... |
|---|---|---|---|---|---|
| P_001 | *** | USER A | (H_01,C_001), (H_02,C_012), (H_03,C_003), ... | 100 | ... |
| P_002 | *** | USER B | (H_01,C_001), (H_02,C_002), (H_02,C_013), ... | 30 | ... |
| P_003 | *** | USER C | (H_01,C_021), (H_02,C_002), (H_02,C_023), ... | 50 | ... |
| P_004 | *** | USER D | (H_01,C_031), (H_02,C_032), (H_03,C_003), ... | 3 | ... |
| ... | ... | ... | ... | ... | ... |

FIG.4

| CARD ID | NAME | IMAGE | CHARACTER NAME | RARITY | PHYSICAL POWER | OFFENSIVE POWER | DEFENSIVE POWER | ATTRIBUTE | ... |
|---|---|---|---|---|---|---|---|---|---|
| C_001 | CARD X | C1.jpg | CHARACTER X | SR | 500 | 100 | 100 | THUNDER | ... |
| C_002 | CARD Y | C2.jpg | CHARACTER Y | R | 450 | 90 | 100 | WATER | ... |
| C_003 | CARD Z | C3.jpg | CHARACTER Z | N | 400 | 50 | 70 | FIRE | ... |
| ... | ... | ... | ... | ... | ... | ... | ... | ... | ... |

FIG.5

| USER | CARD ID | OTHER USERS | ... |
|---|---|---|---|
| USER A | C_001 | USER B ... | ... |
| | C_012 | ... | ... |
| | C_003 | USER D ... | ... |
| | ... | ... | ... |

PROGRAM, INFORMATION PROCESSING DEVICE, AND CONTROL METHOD

FIELD

The present invention relates to a game program, a game control method, and an information processing device, and particularly to, a game program, a game control method, and an information processing device which realize a game that is played by using a game medium.

BACKGROUND

Recently, a game in which a battle with an opponent character is performed by using a game medium such as a character card has been actively provided.

For example, Patent Literature 1 discloses a game in which a deck is set with a game medium, and is then used to defeat a raid battle game and a stage defeating type game. In the game, the game medium is newly provided to a user, for example, as a defeating reward of the raid battle game or the stage defeating-type game. Alternatively, the game medium may be provided to the user on the basis of reduction of an in-game currency.

[Patent Literature 1], referenced above, is Japanese Patent Application No. JP-A-2017-108817

SUMMARY

In the game that is played by using the game medium, strengthening of the game medium is typically performed by a behavior of a user that owns the game medium. In other words, a strengthening effect of the game medium by the behavior of the user is limited to an effect on the game medium that is owned by the user.

The exemplary embodiments described herein address the above-described problem, and an object thereof is to provide a game program, a game control method, and an information processing device which realize a game capable of allowing users to continuously play a game such as is contemplated in exemplary embodiments herein by allowing users to cooperate with each other on the basis of owned game media.

According to an exemplary embodiment, there may be provided a game program that allows a computer to realize: a game medium storage function of storing a plurality of game media associated with a user, and parameter values of the game media in a storage unit; an extraction function of extracting other users associated with a corresponding game medium that may be a game medium having a predetermined relationship with a game medium stored in the storage unit in association with a first user; an extracted user storage function of storing the other users extracted by the extraction function in the storage unit in association with the first user; a fluctuation determination function of determining whether or not a parameter value of the game medium associated with the first user fluctuates; a processing function of allowing the parameter value of the corresponding game medium to automatically vary on the basis of a determination result by the fluctuation determination function; and a parameter value storage function of updating the parameter value of the corresponding game medium to a parameter value varied by the processing function, and of storing the resultant parameter value in the storage unit.

The game program may further allow the computer to realize: a game medium display information generation function of generating information for displaying a plurality of the game media (which may hereinafter be referred to as a "game medium visualization function"), which may be stored in the storage unit in association with the first user, on a display screen of a terminal of the first user in a manner capable of being selected; and a game medium selection acceptation function of accepting selection of at least one game medium by the first user among the plurality of game media displayed on the display screen (which may hereinafter be referred to as a "game medium confirmation function"). The extraction function may extract other users associated with a corresponding game medium having a predetermined relationship with a game medium that may be accepted by the game medium confirmation function.

The game medium visualization function may generate information for displaying the plurality of game media on the display screen in such a manner that the first user may be capable of selecting the game medium only in a number that does not exceed a predetermined number of selections in selection of the game medium by the first user.

The game program may further allow the computer to realize: a user display information generation function of generating information for displaying the other users extracted by the extraction function on a display screen of a terminal of the first user in a manner capable of being selected (which may hereinafter be referred to as a "user visualization function"); a user selection acceptation function of accepting selection of at least one another user by the first user among the other users displayed on the display screen (which may hereinafter be referred to as a "user confirmation function"); and a selected user storage function of storing the other user who may be selected and the first user in the storage unit in association with each other on the basis of selection that may be accepted by the user confirmation function. In a case where it is determined from a result of the determination by the determination function that the parameter value of the game medium associated with the first user fluctuates, the processing function may allow only the parameter value of the corresponding game medium associated with the other user who may be selected to vary.

The user visualization function may generate information that may be displayed on the display screen so that in selection of a target user (the other user) by the first user, the selection may be capable of being made only in a number that does not exceed a predetermined number of selections.

The user visualization function may generate information that may be displayed on the display screen so that in selection of the other user by the first user, the selection may be capable of being made only within a predetermined period.

The game program may further allow the computer to realize: a subscription group storage function of storing the first user and a subscription group in the storage unit in association with each other in correspondence with a game progress situation; and a relationship determination function of determining whether or not the game medium associated with the first user and a game medium associated with a user belonging to the subscription group have a predetermined relationship. In a case where it is determined from a result of the determination by the relationship determination function that the game media have the predetermined relationship, the extraction function may extract a user associated with the game medium having the predetermined relationship as the other user.

The game program may further allow the computer to realize: a group storage function of storing the user and a name of a group to which the user subscribes in the storage unit in association with each other; a group display information generation function of generating information for displaying a list of group names stored in the storage unit on a display screen of a terminal of the first user in such a manner that the list may be capable of being selected (which may hereinafter be referred to as a "group visualization function"); and a group selection acceptance function of accepting selection of at least one of the subscription group by the first user among a plurality of groups displayed by the group visualization function (which may hereinafter be referred to as a "group confirmation function").

In a case where the first user withdraws from a subscription group, the extracted user storage function may cancel association between the first user and the other users associated with the first user, and may store the first user and the other users in the storage unit.

The group visualization function may generate information for displaying matching information based on the number of the other users who are associated with the user when the user subscribes to the group for every group.

In a case where one parameter value of the game medium associated with the first user fluctuates, the processing function may allow another parameter value, which may be different from the one parameter value of the game medium, of the corresponding game medium to vary.

The processing function may automatically calculate a variation amount of the parameter value of the corresponding game medium on the basis of a fluctuation amount of the parameter value of the game medium associated with the corresponding game medium.

The processing function may make a variation amount of the parameter value of the corresponding game medium be different during a predetermined period after associating the first user and the game medium with each other from what the variation amount is outside of the predetermined period.

The game program may further allow the computer to realize a game medium acquisition determination function of determining whether or not the first user newly acquires a game medium (hereinafter a "game medium award function"), and in a case where the game medium award function determines that the first user newly acquires the game medium, the game medium storage function may store the first user, the game medium, and the parameter value of the game medium in the storage unit in association with each other.

The game program may further allow the computer to realize a game medium discarding determination function of determining whether or not the first user discarded the game medium (hereinafter a "game medium removal function"). In a case where the game medium removal function determines that the first user discarded the game medium, the game medium storage function may cancel the association between the first user, the game medium, and the parameter value of the game medium which may be stored in the storage unit.

The game program may further allow the computer to realize a notification information generation function of generating information for displaying a notification (hereinafter a "notification formulation function"), which indicates a variation of the parameter value, on a display screen of the other users associated with a corresponding game medium of which a parameter value varies by the processing function.

The notification formulation function may generate information so that information related to the processing in which the parameter value varies may be included in the notification.

The game program may further allow the computer to realize a game medium award function of determining whether or not the first user acquires a game medium. In a case where the game medium award function determines that the first user newly acquires the game medium, the game medium storage function may store the first user, the game medium, and a parameter value of the game medium in the storage unit in association with each other, and the notification formulation function may display a notification, which indicates that the first user and the game medium may be associated with each other, with respect to additional users who may not be associated with a corresponding game medium that may be a game medium having a predetermined relationship with the newly acquired game medium, and/or other users who may be associated with the corresponding game medium that may be a game medium having a predetermined relationship with the newly acquired game medium.

The game program may further allow the computer to realize a game medium removal function of determining whether or not the first user discarded a game medium. In a case where the game medium removal function determines that the first user discarded the game medium, the game medium storage function may cancel association between the first user, the game medium, and a parameter value of the game medium which may be stored in the storage unit, and the notification formulation function may display a notification, which indicates that the association between the first user and the game medium is cancelled, with respect to other users associated with a corresponding game medium that may be a game medium having a predetermined relationship with the discarded game medium.

According to an exemplary embodiment, there may be provided a game processing method that allows a computer to execute: a game medium storage step of storing a plurality of game media associated with a user, and parameter values of the game media in a storage unit; an extraction step of extracting other users associated with a corresponding game medium that may be a game medium having a predetermined relationship with a game medium stored in the storage unit in association with a first user; an extracted user storage step of storing the other users extracted in the extraction step in the storage unit in association with the first user; a fluctuation determination step of determining whether or not a parameter value of the game medium associated with the first user fluctuates; a processing step of allowing the parameter value of the corresponding game medium to automatically vary on the basis of a determination result in the fluctuation determination step; and a parameter value storage step of updating the parameter value of the corresponding game medium to a parameter value that varied in the processing step, and of storing the resultant parameter value in the storage unit.

According to an exemplary embodiment, there may be provided an information processing device including: a game medium storage unit that stores a plurality of game media associated with a user, and parameter values of the game media; an extraction unit that extracts other users associated with a corresponding game medium that may be a game medium having a predetermined relationship with a game medium stored in the storage unit in association with a first user; an extracted user storage unit that stores the other users extracted by the extraction unit in the storage unit in association with the first user; a fluctuation determination unit that determines whether or not a parameter value of the game medium associated with the first user fluctuates; a processing unit that allows the parameter value of the corresponding game medium to automatically vary on the basis of a determination result in the fluctuation determination unit; and a parameter value storage unit that updates the parameter value of the corresponding game medium to a parameter value that varied in the processing unit, and stores the resultant parameter value in the storage unit.

According to a game that may be realized by the game program, the game control method, and the information processing device, it may be possible to allow a user to continuously play a game that may be realized by the invention.

BRIEF DESCRIPTION OF THE DRAWINGS

FIG. 3 is a data configuration diagram illustrating an example of a data configuration that may be stored in a storage unit;

FIG. 4 is a data configuration diagram illustrating an example of the data configuration that may be stored in the storage unit;

FIG. 5 is a data configuration diagram illustrating an example of the data configuration that may be stored in the storage unit;

DETAILED DESCRIPTION

Hereinafter, an embodiment of the present disclosure will be described with reference to the accompanying drawings.

First, a game system according to an exemplary embodiment may be described with reference to FIG. 1. The game system includes a plurality of terminal devices 100 and a server device 200. Only one terminal device 100 may be illustrated in FIG. 1 for convenience. The server device 200 may provide a game to the terminal device 100 that may be owned by an individual user. The server device 200 and the terminal device 100 may be connected in a communication possible manner, for example, through a network 300 such as the Internet.

As the terminal device 100, a multi-functional portable phone (so-called smartphone) may be assumed, but the invention may not be limited thereto. The terminal device 100 may be an arbitrary device as long as the invention is applicable thereto, and examples thereof include a portable telephone (so-called picture phone), a personal digital assistant (PDA), a portable gaming machine, a portable music player, a tablet terminal, a tablet PC, a notebook PC, and the like.

Figure 1:
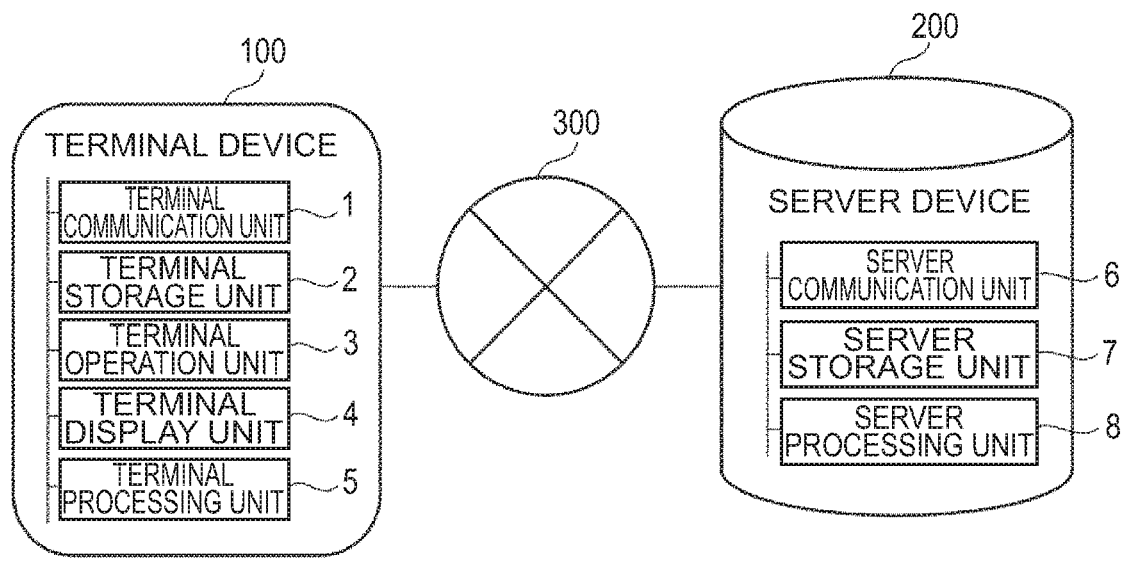
FIG. 1 is a configuration diagram illustrating an example of a configuration of an exemplary embodiment of a game system.

As illustrated in FIG. 1, the terminal device 100 may include a terminal communication unit 1, a terminal storage unit 2, a terminal operation unit 3, a terminal display unit 4, and a terminal processing unit 5. The terminal device 100 may request the server device 200 to allow a game to progress in correspondence with an operation of the terminal operation unit 3 (a touch panel, a button, and the like) by a user. In addition, the terminal device 100 may receive display data related to the progress of the game from the server device 200, and may display the display data.

The terminal communication unit 1 may be provided with a communication interface circuit including an antenna in which a predetermined frequency band may be set as a sensitive band, and may connect the terminal device 100 to a radio communication network. The terminal communication unit 1 may establish a radio signal line conforming to a code division multiple access (CDMA) with a base station through a channel that can be allocated by the base station, and may perform communication with the base station. In addition, the terminal communication unit 1 may transmit data supplied from the terminal processing unit 5 to the server device 200 and the like. In addition, the terminal communication unit 1 may supply information supplied from the server device 200 and the like to the terminal processing unit 5. Furthermore, the terminal communication unit 1 may perform radio communication, which conforms to a radio communication method of IEEE. 802.11 standards, with an access point of wireless fidelity (Wifi) (not illustrated).

For example, the terminal storage unit 2 may include a semiconductor memory such as a volatile memory or a non-volatile memory. The terminal storage unit 2 may store an operating system program, a driver program, an application program, data, and the like which can be used in processing in the terminal processing unit 5. For example, the terminal storage unit 2 may store an input device drive program that controls the terminal operation unit 3, an output device driver program that controls the terminal display unit 4, and the like as a driver program. In addition, the terminal storage unit 2 may store a program that may perform acquisition and display of display data related to progress of a game, and the like as an application program. For example, the computer program may be installed in the terminal storage unit 2 from a computer-readable portable recording medium such as a compact disk read only memory (CD-ROM) and a digital versatile disk read only memory (DVD-ROM) by using a known setup program and the like. In addition, the computer program may be installed in the terminal storage unit 2 from a specific server device and the like through radio communication. In addition, the terminal storage unit 2 may store a user ID that provides identification information of a user of the terminal device 100, display data related to progress of a game, video data, image data, and the like as data. In addition, the terminal storage unit 2 may temporarily store temporal data related to predetermined processing.

The terminal operation unit 3 may be any device as long as an operation of the terminal device 100 may be possible, and examples thereof include a touch panel, a key button, and the like. A user can input a character, a digit, a symbol, and the like by using the terminal operation unit 3. When being operated by the user, the terminal operation unit 3 generates a signal corresponding to the operation. In addition, the signal that is generated may be supplied to the terminal processing unit 5 as an instruction of the user.

The terminal display unit 4 may also be any device that allows for display of a video, an image, and the like, and examples thereof include a liquid crystal display, an organic electroluminescence (EL) display, and the like. The terminal display unit 4 may display a video corresponding to video data supplied from the terminal processing unit 5, an image corresponding to image data supplied from the terminal processing unit 5, and the like.

The terminal processing unit 5 may include one or a plurality of processors and peripheral circuits thereof. For example, the terminal processing unit 5 may be a central processing unit (CPU) and may collectively control overall operations of the terminal device 100. The terminal processing unit 5 may control operations of the terminal communication unit 1, the terminal display unit 4, and the like so that various kinds of processing of the terminal device 100 may be executed in an appropriate sequence on the basis of a program stored in the terminal storage unit 2, an operation of the terminal operation unit 3, and the like. The terminal processing unit 5 may execute processing on the basis of programs (an operating system program, a driver program, and application program, and the like) stored in the terminal storage unit 2. In addition, the terminal processing unit 5 can execute a plurality of programs (an application program and the like) in parallel.

In addition, respective units of the server device 200 have the same functions as those of the terminal device 100.

Here, an overview of a game according to this embodiment may be described. The game according to this embodiment may be a game that plays a battle by using a game medium. The game medium stated here may be electronic data that may be used in the game, and may be set to include, for example, a card, an item, a character, and an avatar, level information, status information, parameter information (a health point value, offensive power, and the like), capability information (skill, ability, magic word, job, and the like). In addition, the game medium may be electronic data that can be acquired, owned, used, managed, exchanged, composed, strengthened, sold, discarded, and/or donated by a user in the game in correspondence with the progress of the game, but usage aspects of the game medium may not be limited to aspects stated explicitly in this specification. In the game according to this embodiment, a user can grow a card or a character or can acquire an item by executing a quest, but there may be no limitation thereto.

In this embodiment, a card of a character registered in a game system in advance may be described as an example of the game medium. Furthermore, the character and the card have concepts different from each other, and the character may be allocated to each card in this embodiment. Cards of a user character or an opponent character which may be used in a battle include battle parameters. Examples of the battle parameters include offensive power, defensive power, health points (or hit points (HP)), attributes (for example, fire, water, thunder, and the like), rarity (for example, normal, rare, S (super rare), SS (double super rare), SSS (triple super rare, legend, and the like), an invocation rate of a skill (special effect), an attacking speed (the number of times of attacks in one turn, the number of turns up to attacking, and the like), parameters such as the number of defenses in one battle, and/or a job (for example, a job, a branch of an army, and the like). In addition, a card to which one character can be allocated may not be limited to one card, and a plurality of cards different in a battle parameter may be allocated for every character. In addition, the character may be provided separately from the card, or may be allocated to a game medium (for example, a figure, and the like) other than the card.

As the game according to this embodiment, a game in which a battle may be played by using a game medium may be assumed. However, the game may include, for example, game contents such as a quest, a mission, a minigame, growth, strengthening, and composition of the game medium, a game medium acquisition event, a virtual space search event, and a battle event with a battle opponent (for example, another user, an opponent character, a building of an opponent, and the like).

For example, in a case where it is determined that one or more predetermined conditions (game tasks) set for every game content have been successfully accomplished, a game medium and the like may be given to the user as a reward. As the game tasks, for example, arbitrary tasks corresponding to game contents can be employed, and examples thereof include a task of winning in a battle with an opponent character, a task of arriving at a goal site in a virtual space, and the like. In addition, among the one or more game tasks set to the game contents, accomplishment of a specific task (completion task) may also be referred to as "completing of game content". In a case where a user who plays the game content succeeds in accomplishment of the completion task, it may be determined that the game content has been completed, and the game content may be terminated.

Various game contents may include a game content for single-player play, and a game content for multi-player play. The game content for single-player play may be a game content (for example, a game content for one person) that may be executed on the basis of a user operation with respect to one terminal device that may be used by one user. For example, the game content for single-player play may be executed by one terminal device alone, or one terminal device and a server device in cooperation with each other. On the other hand, the game content for multi-player play may be a game content (for example, a game content for multiple people) that may be executed on the basis of user operation with respect to two or more terminal devices which may be respectively used by two or more users and may be common to the two or more users. The game content that may be common to two or more users may include game content in which at least a part of progress processing, a processing result, and the like of the game content may be commonly applied to the two or more users. Two or more terminal devices may cooperate, or two or more terminal devices and the server device may cooperate to execute the game content for multi-player play.

The game according to this embodiment may include game contents in which a user may perform search of a virtual space and a battle with a battle opponent by operating a game medium. To describe this further, for example, the game medium stated here may include a user character that may be owned by a user in a game, but there may be no limitation thereto. In addition, in description, the battle opponent may include, for example, an opponent character such as a non-player character (NPC), but there may be no limitation thereto. For example, in a game content for multi-player play, a game medium that may be operated by another user may be determined as a battle opponent.

Figure 2:
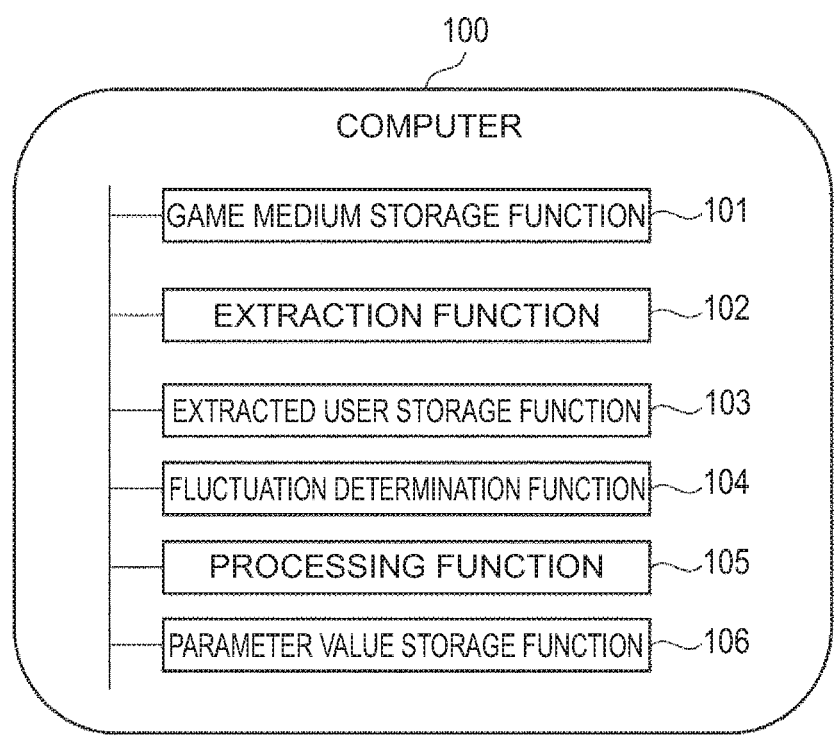
FIG. 2 is a configuration diagram illustrating an example of a functional configuration of an exemplary embodiment of a game program.

Next, an exemplary embodiment of a game program may be described. As illustrated in FIG. 2, the game program of the invention may allow a computer 100 to realize a game medium storage function 101, an extraction function 102, an extracted user storage function 103, a fluctuation determination function 104, a processing function 105, and a parameter value storage function 106. Hereinafter, description may be given of each processing with reference to a sequence diagram illustrated in FIG. 14. However, FIG. 14 may illustrate processing of the server device according to an exemplary embodiment and processing of the terminal device related to transfer of information with the server device; further, it may not be intended to exclude execution of various kinds of processing not illustrated in the drawing in the server device and the terminal device.

The game medium storage function 101 may store a plurality of game media associated with a user, and parameter values of the game media in a storage unit (S100).

FIG. 3 and FIG. 4 may be data tables illustrating an example of data that may be stored in the storage unit. As illustrated in FIG. 3, the storage unit may store each user and a game medium (here, a card ID) that may be owned by the user in association with each other. As an example, FIG. 3 may illustrate a state in which a user A owns at least a card of an ID "C-001", a card of and ID "C-012", and a card of an ID "C-003". In addition, the storage unit can store information related to a user. As an example, FIG. 3 may illustrate a plurality of pieces of information related to users A to D. The information related to a user, which may be stated here, may include, for example, a user ID, a password, a user name, information (owned card information) related to an owned game medium, a user level, and the like. The information related to a user can be stored in association with the user ID. Furthermore, the user ID may be information that can uniquely identify a user. Hereinafter, the user ID may also be referred to simply as the "user".

The information related to an owned game medium may include various pieces of information peculiar to the game medium that may be owned by a user in a game. In a case where a game medium may be acquired by the user, the game medium may be associated with the user as an owned game medium. In this embodiment, the owned game medium may include a user character that may be owned by the user, but there may be no limitation thereto. Details of information related to the owned game medium may be described later.

In addition, although not illustrated in FIG. 3, information related to a game medium that may be used may be included as the information related to a user. The information related to the game medium that may be used may be information indicating a game medium that may be used by a user in battle contents. The game medium that may be used may be selected among owned game media. As an example, maximum three user characters selected from one or more owned game media can be associated with a user as a game medium that may be used. Accordingly, one user character may be not only an owned game medium but also a game medium that may be used. For example, selection of the game medium that may be used may be executed automatically or in correspondence with a user operation in dedicated game contents. For example, the dedicated game contents may include game contents which perform formation of a so-called deck, formation of a team, and the like.

That is, in the information related to a user, each of a plurality of users, and information related to an owned game medium and a game medium that may be used can be associated with each other.

In addition, as illustrated in FIG. 4, the storage unit may store parameter values related to parameters of each game medium in association with the game medium.

As an example, FIG. 4 may illustrate parameters of a card of an ID "C-001", a card of an ID "C-002", and a card of an ID "C-003". The parameters can include a card ID, a card name, a card image, a character name, rarity, health points (maximum hit points (HP)), offensive power, defensive power, an attribute, and the like. In addition, although not illustrated in the drawing, the parameters can include a character ID, a level, a HP grade, a maximum special point (SP) value, an SP grade, an offensive power grade, a defensive power grade, satisfaction, a satisfaction grade, and information related to a game function. Furthermore, the card and the character may not be different concepts, and can be uniquely set. In this case, the character ID and the card ID may be set to be the same, or any one thereof may be set.

In an exemplary embodiment, the parameters may include a parameter which a user cannot adjust in an arbitrary manner, a parameter which a user can adjust in an arbitrary manner, and a parameter that varies in correspondence with a variation of another parameter. Here, the parameter which a user can adjust in an arbitrary manner may include, for example, a parameter which can be selected in correspondence with a user operation, and of which a value can be determined or vary in correspondence with the user operation. On the other hand, the parameter which the user cannot adjust in an arbitrary manner may include, for example, a parameter which can be automatically determined or vary regardless of a user operation. For example, the parameter which the user cannot adjust in an arbitrary manner may include a parameter that automatically varies in synchronization with a variation of the parameter (for example, a second parameter) which the user can adjust in an arbitrary manner, and a parameter that automatically varies in synchronization with occurrence of a predetermined event in a game. The predetermined event may include, for example, an event of winning in a battle with an opponent character.

The character ID may be information that can uniquely identify a user character. For example, the character ID may be stored in a storage unit in advance. Alternatively, the character ID may be determined by the server device when allowing a user to acquire the user character.

The character name may be information indicating a user character name. The character name may not uniquely identify the user character differently from the character ID. An initial value of the character name may be stored in the server storage unit in advance. The character name may vary in correspondence with playing of a game by a user that acquires the user character.

The level may be information indicating the degree of growth of the user character. For example, the greater a value of the level, the greater the degree of growth of the user character is. In this embodiment, the value of the level may be a total value of the HP grade, the SP grade, the offensive power grade, the defensive power grade, and the satisfaction grade. Details of the HP grade, the SP grade, the offensive power grade, the defensive power grade, and the satisfaction grade may be described later.

The rarity may be information indicating rarity of the user character. For example, the greater a value of the rarity is, the higher the rarity of the user character is. The rarity may vary in correspondence with playing of a game by a user that acquires the user character. In this embodiment, in processing related to growing of the user character to be described later, the rarity increases in accordance with consumption of a specific game medium. As the value of the rarity increases, the upper limit of each of the HP grade, the SP grade, the offensive power grade, the defensive power grade, and the satisfaction grade increases. For example, the rarity may increase in accordance with consumption of a specific game medium, and the upper limit of at least one of the HP grade, the SP grade, the offensive power grade, the defensive power grade, and the satisfaction grade may increase. Accordingly, a greater rarity may present further advantages for a user.

For example, the maximum HP may be information indicating the maximum value of HP that may be a parameter indicating vitality of the user character. In this embodiment, when the user character may be damaged by an attack operation of an opponent character, HP decreases by a damage amount. In addition, when the user character is recovered by a recovery operation, HP may increase by a recovery amount. In addition, when HP decreases to zero, the user character may enter a disabled state, or it may be determined that the user has failed to complete game content. Accordingly, as the maximum HP of the user character becomes greater, it may be more advantageous for a user.

The HP grade may be information indicating the degree of growth related to the maximum HP of the user character. In this embodiment, in processing related to growth of the user character to be described later, the maximum HP and the HP grade may increase in accordance with consumption of a specific game medium. Accordingly, the further the HP grade increases, the further the maximum HP may increase, and thus it may be advantageous for a user.

For example, the maximum SP may be information indicating the maximum value of SP that may be a parameter consumed when the user character executes a predetermined operation. For example, as to be described later, the predetermined operation may include an operation that can be executed when a game function corresponding to the operation becomes valid. In this embodiment, when a user operation of allowing the user character to execute a predetermined operation may be detected, SP of the user character may be reduced by a value of consumption SP that may be set to the operation, and the operation may be executed. In a case where SP of the user character may not be recovered to the consumption SP of the operation, control may be performed so that the operation cannot be executed. Accordingly, as the maximum SP of the user character becomes greater, it may be more advantageous for a user.

The SP grade may be information indicating the degree of growth related to the maximum SP of the user character. The SP grade may be the same as the HP grade corresponding to the maximum HP except for a point value corresponding to the maximum SP, and thus description thereof may be omitted.

For example, the offensive power may be information that contributes to a damage amount that may be applied to a battle opponent due to an attack of the user character. The greater a value of the offensive power is, the greater the damage amount applied to a battle opponent may be. Accordingly, as the offensive power of the user character becomes greater, it may be more advantageous for a user.

The offensive power grade may be information indicating the degree of growth related to the offensive power of the user character. The offensive power grade may be the same as the HP grade corresponding to the maximum HP except for a point value corresponding to the offensive power, and thus description thereof will not be repeated.

For example, the defensive power may be information that contributes to a damage amount that may be applied when the user character is damaged due to an attack from a battle opponent. The greater a value of the defensive power is, the less the damage amount from the battle opponent is. Accordingly, as the defensive power of the user character becomes greater, it may be more advantageous for a user.

The defensive power grade may be information indicating the degree of growth related to the defensive power of the user character. The defensive power grade may be the same as the HP grade corresponding to the maximum HP except for a point value corresponding to the defensive power, and thus description thereof will not be repeated.

For example, the satisfaction may be information that contributes to a probability in which an execution result of an operation by the user character becomes different from a typical result. For example, as a value of the satisfaction becomes greater, a probability in which damage applied to a battle opponent due to an attack of the user character further increases in comparison to a typical case may further increase. In addition, for example, as the value of the satisfaction becomes greater, a probability in which an additional effect (for example, pursuit) occurs when the user character may perform an attack may further increase. Accordingly, as the satisfaction of the user character becomes greater, it may be more advantageous for a user.

The satisfaction grade may be information indicating the degree of growth relating to the satisfaction of the user character. The satisfaction grade may be the same as the HP grade corresponding to the maximum HP except for a point value corresponding to the satisfaction, and thus description thereof will not be repeated.

The attribute may be information indicating a dominant-subordinant relationship between characters which play a battle. For example, the attribute indicates at least one attribute among fire, tree, and water. For example, in a fire-attribute character, damage applied to a tree-attribute character may further increase in comparison to a typical case, and damage applied to a water-attribute character may further decrease in comparison to a typical case. In this manner, for example, the fire attribute may be advantageous in comparison to the tree attribute, and may be disadvantageous in comparison to the water attribute.

The information related to a game function may include information indicating whether or not a game function is valid with respect to each of one or more game functions associated with the user character, and a grade of the game function that is valid. One user character may be associated with an arbitrary number of game functions. Processing for making the game function valid will be described later. Exhibition of the valid game function may be permitted, and exhibition of invalid game function may be prohibited. The game function may include various functions which can be exhibited during execution of a game. For example, when the game function is exhibited, an effect advantageous for a user can occur in the game. Accordingly, when the game function becomes valid, it can be advantageous for the user.

For example, the game function may include a function that may be exhibited at a timing corresponding to a user operation. Hereinafter, the game function that may be exhibited at a timing corresponding to a user operation may also be referred to as "active skill". When the active skill may be exhibited, for example, the user character may execute a specific operation. For example, an effect of applying damage greater in comparison to a typical attack operation to a battle opponent occurs through execution of the specific operation. The consumption SP may be set to the active skill. In this case, the active skill may be exhibited under a condition in which SP of the user character may be consumed by a value of the consumption SP. In addition, for example, the game function may include, for example, a function that may be exhibited continuously from a valid point of time. Hereinafter, the game function that may be exhibited continuously may also be referred to as a "passive skill". When the passive skill is exhibited, for example, a status of the user character may vary. When the status of the user character varies, for example, an effect in which a second parameter such as the maximum HP of the user character may be increased, and an effect in which a predetermined character (for example, a characteristic of decreasing an applied damage amount and the like) may be given to the user character, and the like occur.

As the grade value of the game function increases, an effect that occurs due to exhibition of the game function may also increase. For example, the greater the grade of the active skill that applies damage to a battle opponent is, the greater a damage amount applied to the battle opponent due to the active skill may be. In this embodiment, for example, one grade, which may be common to one or more valid game functions of which a grade increases due to consumption of a specific game medium, may be set. Alternatively, a grade may be set for every valid game function.

In addition, the storage unit may store information related to an opponent character. The opponent character can be used as a battle opponent of the user character that may be a game medium used by a user in a battle. The information related to the opponent character may include arbitrary information peculiar to the opponent character. For example, the information related to the opponent character may include a character ID, a character name, a level, a maximum HP, a maximum SP, offensive power, defensive power, satisfaction, and an attribute. The information related to the opponent character may be the same as the information related to the user character, and thus description thereof will not be repeated.

Furthermore, association between a user and a game medium can be performed, for example, when the user acquires the game medium in progress of a game. With regard to an example of acquisition of the game medium, the game medium may be acquired as a reward in the case of executing a quest and winning a battle, or when drawing a lottery type card that may be called "gacha". However, acquisition means may not be limited thereto.

Furthermore, in this embodiment, description has been given on the assumption that the storage unit may be the server storage unit of the server device 200, but there may be no limitation thereto. Particularly, in a case where the game of the invention may be a native game, it may be assumed that information stored in the server storage unit and information stored in the terminal storage unit may be transmitted and received at an appropriate timing, and update processing of storage contents may be performed.

The extraction function 102 extracts other users associated with a corresponding game medium that may be a game medium having a predetermined relationship with a game medium stored in the storage unit in association with a first user (S200). Specifically, for example, display information generated by the following game medium visualization processing (S110) may be transmitted to a terminal device, selection information of at least one game medium may be received from a terminal device of the first user corresponding to the transmission, and game medium confirmation processing (S120) can be performed. In addition, a game medium having a predetermined relationship with the game medium based on the accepted selection information may be specified as the corresponding game medium. In addition, with respect to another user who may be a determination target, determination may be made as to whether or not the corresponding game medium may be included in a game medium with reference to information of the game medium associated with the other user. In a case where the determination result may be positive, the user can be extracted as the other user associated with the corresponding game medium.

For example, the predetermined relationship may include a relationship in which game media may be partially common to each other although not being completely the same as each other in addition to a relationship in which the game media may be completely the same as each other. "The game media may be completely the same as each other" represents that card IDs may be the same as each other as an example. On the other hand, examples of the relationship in which the game media may be partially common to each other include a relationship in which predetermined parameters associated with the card IDs match each other at least partially, a relationship in which the card IDs may be associated, and the like. For example, the latter relationship may be a relationship in which card IDs may be associated with each other in advance in a case where characters drawn on cards may be brothers, friends, a master and a pupil, and the like. It may be preferable that a range of the predetermined relationship may be set to be appropriate for adjustment of an effect attained by an exemplary embodiment such as is described herein.

For example, as illustrated in FIG. 5, in a case where the predetermined relationship is set as a relationship in which card IDs are the same as each other, with regard to extraction, as an example, in a case where the first user is set as a user A, card IDs of cards which may be game media owned by the user A may be "C-001", "C-012", and "C-003", and thus a card having the same card ID as each of the above-described card IDs may be specified as the corresponding game medium. In addition, the extraction function 102 may determine whether or not the corresponding game medium is included in game media with reference to information of game media associated with other users. From a result of the determination, a user B may be extracted as another user associated with the card ID "C-001", and a user D may be extracted as another user associated with the card ID "C_003". Another user may not be associated with the card ID "C-012", and thus any user may not be extracted.

Hereinafter, "a game medium owned by a user" represents a game medium that may be correlated with a user ID that can uniquely identify the user as an owned game media unless particularly specified. In addition, "a game medium may be given to a user" represents that the game medium may be correlated with a user ID as an owned game medium. In addition, "a game medium owned by a user may be discarded" represents that correlation between a user ID and an owned game medium may be canceled. In addition, "a game medium owned by a user may be consumed" represents that it may be possible to cause any effect or any influence to occur in a game due to cancellation of correlation between a user ID and an owned game medium. In addition, "a game medium owned by a user may be sold" represents that correlation between a user ID and an owned game medium may be cancelled, and another game medium (for example, a virtual currency, an item, and the like) may be correlated with the user ID as an owned game medium. In addition, "a game medium owned by a user A may be assigned to a user B" represents that correlation between a user ID of the user A and the owned game medium may be cancelled, and the game medium may be correlated with a user ID of the user B as an owned game medium.

The extracted user storage function 103 may store the other users extracted by the extraction function 102 in the storage unit in association with the first user (S300). Furthermore, in the association, users may be indirectly associated through a game medium associated with the users instead of being directly associated with each other. Specific examples thereof include a case where a game medium a owned by a user A may be associated with a game medium b owned by a user B, and the like. That is, association with any data may be possible as long as the user A and the game medium a owned by the user A, and the user B and the game medium b owned by the user B are respectively associated with each other.

Furthermore, in this embodiment, description has been given on the assumption that the storage unit may be the server storage unit of the server device 200, but association information that may be stored may also be transmitted to the terminal device and may also be stored in the terminal device. In this case, it may be assumed that notification information indicating information of association may be transmitted from the server device to the terminal device.

FIG. 5 is a data table illustrating an example of data that may be stored in the storage unit. As illustrated in FIG. 5, the storage unit may store a first user and another user in association with each other. Specifically, the storage unit may store the first user, a game medium (here, a card ID) owned by the user, and another user who owns a corresponding game medium having a predetermined relationship with the game medium in association with each other. In FIG. 5, as described above, as an example, a user A may own at least a card of an ID "C_001", a card of an ID "C_012", and a card of an ID "C_003". As the other user that may own the corresponding game medium related to each card, a user B can be stored in association with the user A with respect to the ID "C_001", and a user D can be stored in association with the user A with respect to the ID "C_003". Another user may not be associated with user A with respect to the card ID "C_012".

In addition, the fluctuation determination function 104 may determine whether or not a parameter value of a game medium associated with the first user fluctuates (S400). In the invention, the fluctuation determination function 104 can determine only a fluctuation of a parameter value of a game medium associated with another user. A timing at which the fluctuation determination function 104 may determine a fluctuation may not be particularly limited. However, for example, when assuming a native game in which a game progresses on a terminal device, the timing may be set as a timing at which a parameter value of the game medium may be updated (fluctuate) in correspondence with the progress of the game on the terminal device (S310), and information thereof (game information that may include at least a fluctuated game medium, a fluctuated parameter, and a fluctuation amount) may be transmitted to the server device, and the server device may receive the information.

Examples of the parameters include rarity, health points, offensive power, defensive power, an attribute, and the like as described above. Among the parameters, parameters indicated by a numerical value, that is, values set to the health points, the offensive power, the defensive power, and the like may be set as parameter values. In addition, the parameters include a level of a game medium, and a level value can be used as the parameter values.

For example, the parameter values fluctuate in a case where a user wins in a battle, and a bonus value may be given with respect to each of the parameter values, and the like. In addition, for example, the parameter values may fluctuate in a case where a user completed a predetermined quest, and level-up was accomplished, and the like. In addition, the parameter values also may fluctuate through the growth of a game medium (user character) to be described later in detail.

Description may be given of processing related to growing of the user character. The server control unit may allow information related to the user character of the user to vary automatically or in correspondence with a user operation with respect to a terminal device of the user. The server control unit may further allow arbitrary information included in information related to the user other than the information related to the user character to vary. The processing of allowing the information to vary may include processing of updating the information stored in the server storage unit with contents after variation.

Specifically, the server control unit may increase rarity of the user character by consuming a material that may be a predetermined game medium owned by the user. The server control unit may permit an increase of rarity in a case where predetermined one or more conditions are satisfied, and may prohibit the increase of rarity in a case where the one or more conditions are not satisfied. The one or more conditions may include a condition in which a level of the user character is equal to or greater than a predetermined reference value. For example, the reference value may be equal to the upper limit of the level of the user character, or may be determined in an arbitrary manner. The one or more conditions may not be limited to the above-described conditions. Hereinafter, the one or more conditions that can be used in determination as to whether or not to permit the increase of rarity of the user character may also be referred to as "one or more rarity increase conditions".

In addition, the server control unit may allow at least one parameter (for example, maximum HP), which may be automatically selected or selected in correspondence with a user operation with respect to the terminal device among a plurality of parameters of the user character, to vary by consuming a material that may be owned by the user. For example, in correspondence with a variation of the parameter value, the server control unit may allow another parameter value (for example, HP grade) corresponding to the parameter value or a parameter value (level) of the user character to vary.

In addition, the server control unit may make a game function of the user character be valid. The server control unit may permit validation of the game function in a case where a predetermined set of one or more conditions may be satisfied, and may prohibit validation of the game function in a case where the one or more conditions are not satisfied. Alternatively, the server control unit may automatically make the game function be valid in a case where the one or more conditions are satisfied. The one or more conditions may include a condition in which the level of the user character may be equal to or greater than a predetermined reference value corresponding to the game function. The reference value may be determined in an arbitrary manner. In addition, the one or more conditions may include a condition in which a game task (for example, a completion task) set to a specific game content corresponding to the game function was accomplished in the past. The one or more conditions may not be limited to the above-described conditions. Hereinafter, the one or more conditions which can be used in determination as to whether or not to permit validation of the game function of the user character may be also referred to as "one or more first validation conditions". In addition, the specific game content corresponding to the game function may also be referred to as "release content of the game function". As the release content, for example, arbitrary game contents such as a minigame and a battle content can be employed.

In addition, the server control unit may increase a grade of the game function of the user character by consuming a material owned by the user.

The processing function 105 may allow a parameter value of a corresponding game medium to automatically vary on the basis of a result of determination by the fluctuation determination function 104 (S500).

Specifically, in a case where the parameter value of the game medium associated with the first user rises, the processing function 105 can automatically raise the parameter value of the corresponding game medium. Specifically, first, a game medium which may have a fluctuating parameter value may be specified, the fluctuated parameter value and a fluctuation amount thereof may be stored, and variation processing may be performed with respect to the corresponding game medium having a predetermined relationship with the specified game medium. With regard to the variation processing, specifically, a parameter value and a predetermined variation amount may be derived by a predetermined algorithm on the basis of the fluctuation amount that may be stored, and variation processing of a corresponding parameter value can be performed in accordance with the variation amount.

For example, in a case where a value of offensive power of a game medium owned by the first user rises, the processing function 105 may raise a value of offensive power of a corresponding game medium owned by another user. The variation amount of the value can be automatically calculated on the basis of a fluctuation amount of the parameter value of the game medium, and details thereof may be described later.

In addition, the parameter value storage function 106 may update the parameter value of the corresponding game medium to a parameter value varied by the processing function and may store the resultant parameter value in the storage unit (S600). In addition, the information may also be transmitted to the terminal device, and information can be updated in the storage unit of the terminal device.

The server control unit may perform transmission and reception of information through the server communication unit. For example, the server control unit may transmit at least a part of information stored in the server storage unit to the terminal device. In this manner, information stored in the server storage unit and information stored in the terminal device may be shared and synchronized. A timing at which sharing and synchronization of information may be performed may include, for example, a timing at which new information may be stored in the server storage unit and a timing at which information stored in the server storage unit may be updated, but the timing may be determined in an arbitrary manner.

According to this, the parameter value of the corresponding game medium can be stored after being update to the latest state at an appropriate timing.

According to the game program of the invention which may be realized by the above-described configuration, it may be possible to realize a game capable of allowing users to continuously play a game realized by the invention by allowing users to cooperate with each other on the basis of owned game media.

Specifically, even in a case where another user temporarily stops playing a game, there may be a possibility that a parameter value of an owned game medium may rise as a result of playing of the game by the first user. The possibility leads to a motivation of the other user to play the game again, and it may be possible to prevent the other user from withdrawing from the game. Similarly, even in a case where the first user temporarily stops playing a game, there may be a possibility that a parameter value of an owned game medium may rise as a result of playing of the game by the other user. The possibility reads to a motivation of the first user to play a game again, and it may be possible to prevent the first user from withdrawing from the game.

In addition, a behavior of raising the parameter value of the game medium can be performed between a plurality of users in cooperation with each other, and thus it may be possible to raise the parameter value at an earlier period of time in comparison to a case where the behavior is performed by one user, and it may be possible to prevent a decrease in motivation of a user to play a game. In addition, as the number of users who are in a cooperative relationship (associated) may increase, there may be a possibility that the parameter value of the game medium can be raised, and thus it may be possible to activate cooperation between users. In addition, as a predetermined user raises the parameter value of the game medium, a parameter value of the game medium of another user may rise. Accordingly, this leads to a motivation to play a game as a contribution to the other user.

Figure 6:
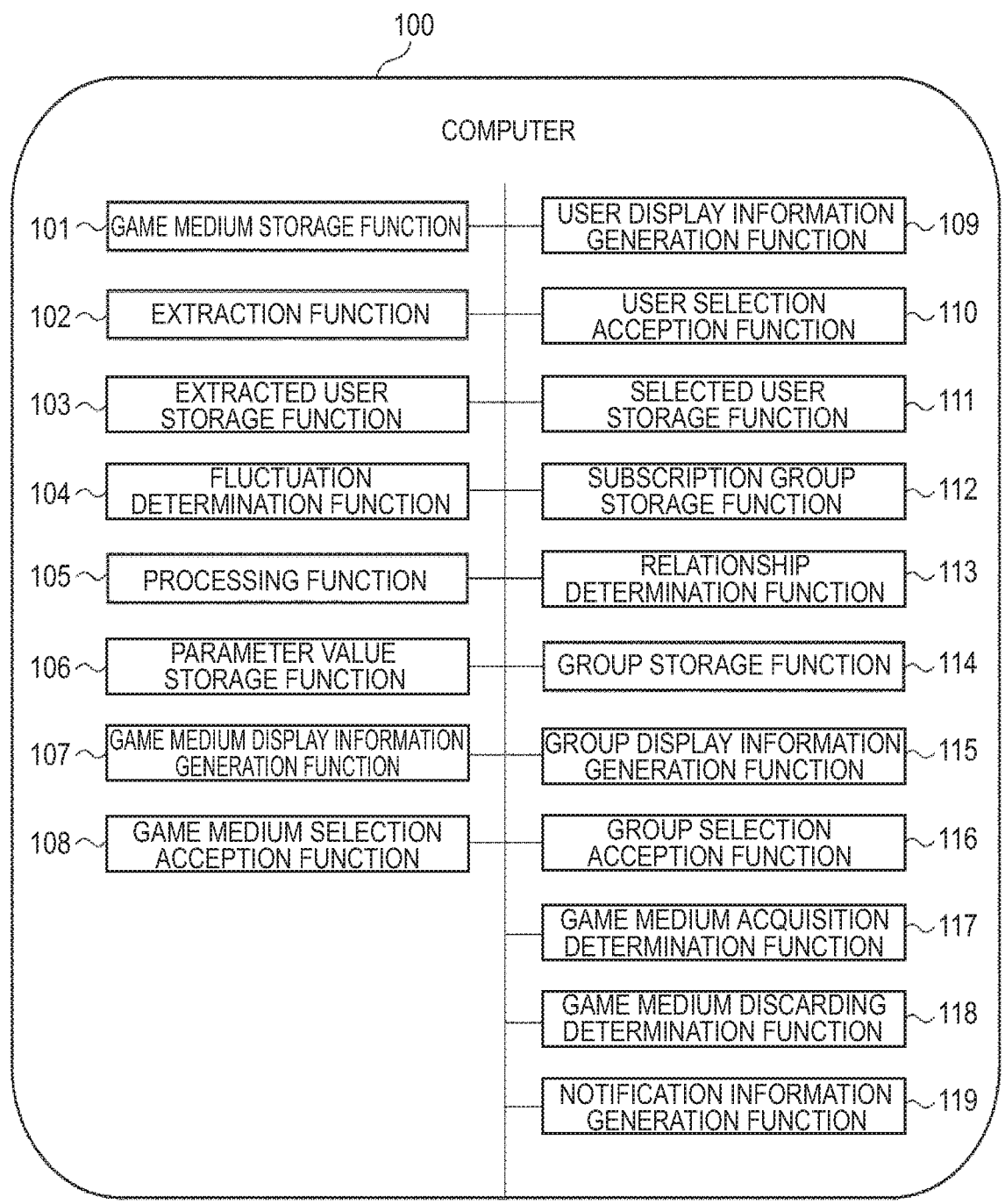
FIG. 6 is a configuration diagram illustrating an example of a functional configuration of an exemplary embodiment of a game program.

As illustrated in FIG. 6, the game program of the invention can further allow the computer to realize a game medium visualization function 107 and a game medium confirmation function 108.

The game medium visualization function 107 may generate information for displaying a plurality of the game media, which may be stored in the storage unit in association with the first user, on a display screen of a terminal of the first user in a manner capable of being selected (S110). The generation can be initiated in the case of receiving information transmitted from a terminal in correspondence with an input to an input unit according to association of a game medium of a user. Specifically, the generation can be performed in the case of receiving information transmitted from a terminal in correspondence with a touch operation with respect to an image indicating the gist of performing association of the game medium on the display screen. Furthermore, the display screen of the terminal of the first user can be set as the terminal display unit 4.

Example of "displayed in a manner capable of being selected" include a configuration in which a plurality of game media may be displayed in a list in combination with parameter values, and the like. In addition, with regard to the game media which may be displayed, a plurality of game media which may be stored in association with a user may be displayed after the order is rearranged in correspondence with a predetermined condition, or only a part of the game media may be extracted and displayed. In this case, the predetermined condition can be set by the user in an arbitrary manner, or may be a condition related to the game medium. For example, the condition may be a condition in which a parameter value of a game medium is equal to or greater than a predetermined value, a magnitude of each parameter value of the game medium that is owned, and the like. In addition, the parameter value that may be displayed may be a partial parameter value of the game medium.

The game medium confirmation function 108 accepts selection of at least one game medium by the first user among a plurality of game media displayed on the display screen (S120).

In a case where the display screen is a touch panel, a selection input by the first user can be performed through touching of the display screen.

In addition, the extraction function 102 can extract other users associated with a corresponding game medium having a predetermined relationship with a game medium that can be accepted by the game medium confirmation function (S200). Details of the extraction processing may be as described above.

According to an exemplary embodiment of the game program which may be realized by the above-described configuration, the first user can freely select a desired game medium among a plurality of owned game media. For example, in a case where a game medium with low rarity is selected, it may be possible to provide a merit with respect to a lot of other users who own a corresponding game medium that may be associated. In contrast, in a case where a game medium with high rarity is selected, it may be possible to provide a merit to limited other users who own a corresponding game medium that may be associated. At this time, it may also be possible to adjust a variation amount of a parameter value of a corresponding game medium in correspondence with rarity of a game medium that may be selected by the first user, and/or the number of game media selected by the first user. Details thereof may be described later.

The game medium visualization function 107 can display a plurality of game media on the display screen in such a manner that the first user can select the game medium only in a number that does not exceed a predetermined number of selections in selection of the game medium by the first user. In addition, in a case where the number of times of selection by the user becomes a predetermined number of selections, the game medium may be grayed out, may be set to non-display, or may transition to an additional screen. According to this, it may be possible to change a display aspect so that the user cannot select the game medium.

For example, the predetermined number of selections may be set to one sheet, five sheets, or the like. However, the predetermined number of selections may not be particularly limited thereto, and may be appropriately changed in consideration of game balance and the like. For example, the predetermined number of selections may vary in correspondence with a parameter related to a user, for example, in correspondence with a level of the user, or the number of log-in dates. In addition, the predetermined number of selections may vary in correspondence with information related game media owned by the user, for example, in correspondence with a total number of the game media which may be owned, the number of game media which satisfy a predetermined condition (condition in which rarity may be equal to or greater than predetermined rarity, a condition in which a parameter value equal to or greater than a predetermined threshold value may be provided, and the like) among the game media owned by the user, an average parameter value of the owned game media, or a total parameter value of the game media. In addition, the predetermined number of selections may vary in correspondence with information of other users associated with the user, for example, in correspondence with the number of other users (the number of users having a friend relationship, the number of users who belong to the same guild) associated with the user, and the like.

According to the above-described configuration, the number of selections may vary in correspondence with a game progress situation, and thus it may be possible to raise a motivation to progress the game. In addition, a user who is progressing the game may be referred to as an active user, that is, as the user is more active, the number of selections may be set to be greater, and thus an opportunity of association with other users further may increase. As a result, activity of the active user leads to an increase of an opportunity that spreads to other users, and thus it may be possible to activate a game. In addition, it may be possible to allow a variation amount with respect to a fluctuation amount of a parameter value to vary in accordance with the variation of the number of selections. Specifically, in the case of increasing or decreasing the number of selections, the variation amount of the parameter value may be increased or decreased. It may be necessary for a user to strategically execute association with other users, and thus a strategic characteristic of a game may increase. As a specific example of the corresponding processing, first, a determination may be made as to whether or not the number of selections of users may vary. In addition, a value of a variation amount with respect to a fluctuation amount corresponding to the varied number of selections may be extracted. Finally, processing may be performed to update the value of the variation amount with respect to the fluctuation amount before updating with the extracted value.

As illustrated in FIG. 6, the game program of the invention can further allow the computer to realize a user visualization function 109, a user confirmation function 110, and a selected user storage function 111.

The user visualization function 109 may generate information for displaying other users extracted by the extraction function 102 on a display screen of a terminal of the first user in a manner capable of being selected (S320).

Figure 7:
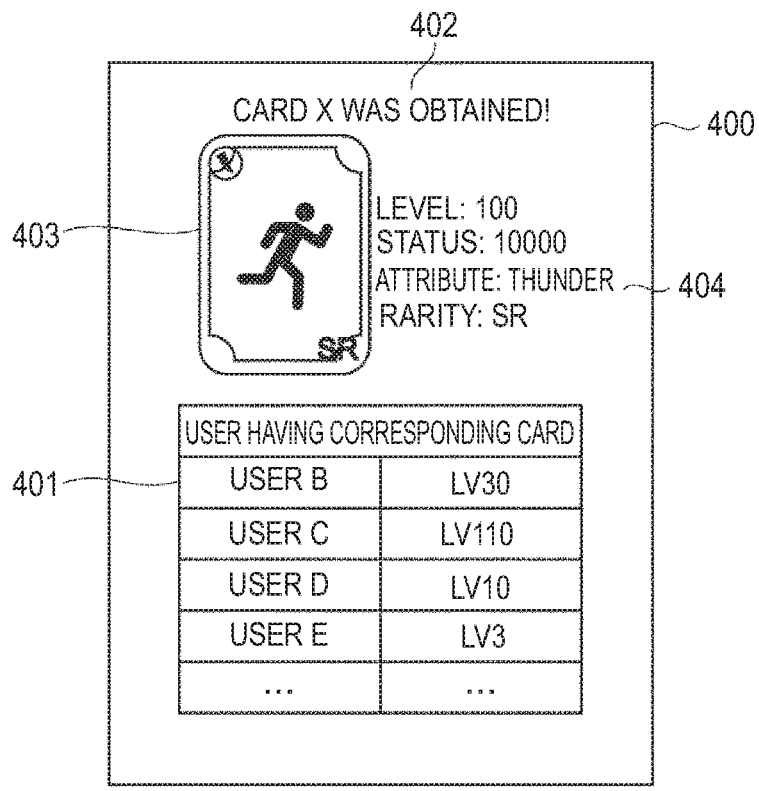
FIG. 7 is an image view illustrating an example of a display screen of a game that may be realized by the game program of the invention.

FIG. 7 is a view illustrating a display screen 400 of a game that may be realized by the game program of the invention. As illustrated in FIG. 7, other users 401 (here, a user B, a user C, a user D, and a user E) extracted by the extraction function 102 may be displayed on the display screen 400 in a manner capable of being selected. In the example illustrated in FIG. 7, display 402 indicating obtainment of a game medium, a game medium 403, parameters and parameter values 404 of the game medium, and the like can be additionally displayed on the display screen 400. Furthermore, it may be assumed that a status displayed here represents a parameter.

A user who may be displayed may be randomly extracted among the extracted users, or may be extracted in correspondence with a parameter of a user, or parameters related to a game medium that may be owned by the user. For example, another user who has a higher user parameter value or may own a game medium having a higher parameter value may be preferentially displayed.

As an example, the extraction function 102 may extract one or more other users among a plurality of users excluding the first user with the above-described algorithm in response to a request from a terminal device of the first user (S200). In addition, the terminal device may transmit information indicating filtering conditions to the server device in combination with the request in correspondence with a user operation. For example, the filtering conditions may be a condition in which parameter values of other users are equal to or greater than a predetermined value, a condition in which a parameter value of a game medium that is owned by the other users is equal to or greater than a predetermined value, and the like. The predetermined value included in the filtering conditions may be determined in correspondence with a user operation with respect to the terminal device, or may be automatically determined by the terminal control unit. Accordingly, a possibility that a user can select a game medium satisfying desired filtering conditions may be improved, and thus usability may be improved.

Figure 8:
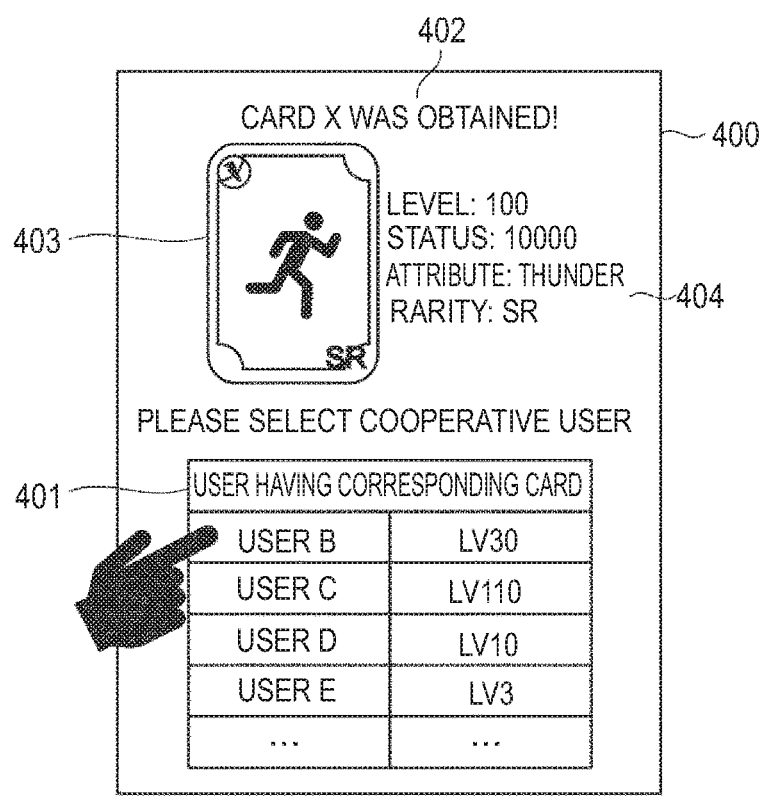
FIG. 8 is an image view illustrating an example of the display screen of the game that may be realized by an exemplary embodiment of a game program.

In addition, as illustrated in FIG. 8, the user confirmation function 110 accepts selection of at least one other users among the other users 401 displayed on the display screen 400 by the first user (S330).

The selected user storage function 111 may store the other users selected on the basis of selection that may be accepted by the user confirmation function 110, and the first user in the storage unit in association with each other (S340). In addition, information related to the association may be also transmitted to the terminal device, and the information can be updated in the storage unit of the terminal device.

In addition, from a result of the determination (S400) by the fluctuation determination function 104, in a case where it may be determined that a parameter value of the game medium associated with the first user fluctuates, the processing function 105 can allow only a parameter value of a corresponding game medium associated with the other users who may be selected to vary (S500).

According to an exemplary embodiment of the game program which may be realized by the above-described configuration, since the first user can allow only the parameter value of the corresponding game medium of the other users who may be selected to vary, cooperation with the other users may become strong, and thus it may be possible to prevent the other users from withdrawing from a game.

The user visualization function 109 can generate information that may be displayed on the display screen 400 so that in selection of a target user by the first user, the selection can be made only in a number that does not exceed a predetermined number of selections. In addition, in a case where the number of times of selection by the user may become a predetermined number of selections, a target user may be grayed out, may be set to non-display, or may transition to an additional screen. According to this, it may be possible to change a display aspect so that the user cannot select the target user.

For example, the predetermined number of selections may be set to one person, five persons, and the like. However, the predetermined number of selections may not be particularly limited thereto, and may be appropriately set in consideration of game balance and the like. For example, the predetermined number of selections may vary in correspondence with a parameter related to a user, for example, in correspondence with a level of the user, or the number of log-in dates. In addition, the predetermined number of selections may vary in correspondence with information related game media owned by the user, for example, in correspondence with a total number of the game media owned by the user, the number of game media which satisfy a predetermined condition (condition in which rarity is equal to or greater than predetermined rarity, a condition in which a parameter value equal to or greater than a predetermined threshold value is provided, and the like) among the game media owned by the user, an average parameter value of the owned game media, or a total parameter value of the game media. In addition, the predetermined number of selections may vary in correspondence with information of other users associated with the user, for example, in correspondence with the number of other users (the number of users having a friend relationship, the number of users who belong to the same guild) associated with the user, and the like.

According to the above-described configuration, the number of selections may vary in correspondence with a game progress situation, and thus it may be possible to raise a motivation to progress the game. In addition, a user who may be progressing the game may be referred to as an active user, that is, as the user is more active, the number of selections may be set to be greater, and thus an opportunity of association with other users further may increase. As a result, activity of the active user may lead to an increase of an opportunity that spreads to other users, and thus it may be possible to activate a game. In addition, it may be possible to allow a variation amount with respect to a fluctuation amount of a parameter value to vary in correspondence with a variation of the number of selections. Specifically, in the case of increasing or decreasing the number of selections, the variation amount of the parameter value may be increased or decreased. It may be necessary for a user to strategically execute association with other users, and thus a strategic characteristic of a game may increase. As a specific example of the corresponding processing, first, determination may be made as to whether or not the number of selections of users has varied. In addition, a value of a variation amount with respect to a fluctuation amount corresponding to the varied number of selections may be extracted. Finally, processing can be performed to update the value of the variation with respect to the fluctuation amount before updating with the extracted value can be performed.

In addition, the user visualization function 109 can generate information that may be displayed on the display screen 400 so that in selection of other users by the first user, the selection may be capable of being made only within a predetermined period. In addition, in the case of exceeding the predetermined period, the other users may be grayed out, may be set to non-display, or may transition to an additional screen. According to this, it may be possible to change a display aspect so that the other users cannot be selected.

For example, the predetermined period may be set to 1 hour, 12 hours, 24 hours, and the like from acquisition of the game medium. However, the predetermined period may not be limited thereto, and may be appropriately set in consideration of game balance and the like. Furthermore, a timing that is a starting point of period count may be set to a predetermined timing, and may be set to a game medium acquisition timing, and the like as an example. For example, the predetermined period may vary in correspondence with a parameter related to a user, for example, in correspondence with a level of the user, or the number of log-in dates. In addition, the predetermined period may vary in correspondence with information related game media owned by the user, for example, in correspondence with a total number of the game media owned by the user, the number of game media which satisfy a predetermined condition (such as a condition in which rarity is equal to or greater than predetermined rarity, a condition in which a parameter value equal to or greater than a predetermined threshold value is provided, and the like) among the game media owned by the user, an average parameter value of the owned game media, or a total parameter value of the game media. In addition, the predetermined period may vary in correspondence with information of other users associated with the user, for example, in correspondence with the number of other users (the number of users having a friend relationship, the number of users who belong to the same guild) associated with the user, and the like.

According to the above-described configuration, the number of selections may vary in correspondence with a game progress situation, and thus it may be possible to raise a motivation to progress the game. In addition, a user who is progressing the game may be referred to as an active user, that is, as the user may be more active, the number of selections may be set to be greater, and thus an opportunity of association with other users further may increase. As a result, activity of the active user may lead to an increase of an opportunity that spreads to other users, and thus it may be possible to activate a game. In addition, it may be possible to allow a variation amount with respect to a fluctuation amount of a parameter value to vary in correspondence with a variation of the number of selections. Specifically, in the case of increasing or decreasing the number of selections, the variation amount of the parameter may be increased or decreased. It may be necessary for a user to strategically execute association with other users, and thus a strategic characteristic of a game may increase. As a specific example of the corresponding processing, first, determination may be made as to whether or not the number of selections of users may vary. In addition, a value of a variation amount with respect to a fluctuation amount corresponding to the varied number of selections may be extracted. Finally, processing of updating the value of the variation with respect to the fluctuation amount before update with the extracted value can be performed.

According to the game program of the invention which may be realized by the above-described configuration, it may be necessary for other users to own a corresponding game media within the period to be selected by the first user, and setting of the period may raise a motivation of the other users to acquire the corresponding game medium, and this may lead to activation of a game.

In addition, as illustrated in FIG. 6, the game program of the invention can further allow the computer to realize a subscription group storage function 112 and a relationship determination function 113. Hereinafter, each processing may be described with reference to a sequence diagram illustrated in FIG. 15. However, FIG. 15 may illustrate processing of the server device, according to an exemplary embodiment, and processing of the terminal device related to transfer of information with the sever device, and it may not be intended to exclude execution of various kinds of processing not illustrated in the drawing in the server device and the terminal device.

The subscription group storage function 112 may store the first user and a subscription group in the storage unit in association with each other in correspondence with the progress of a game (S130). Specifically, information related to a group stored in the storage unit may include various pieces of information peculiar to the group. For example, the information related to the group may include a group ID, a group name, and member information. In the information related to the group, a user group name and the member information may be correlated with the group ID.

The group ID may be information that can uniquely identify a group. Hereinafter, the group ID may also be referred to simply as a "group".

The group name may be information indicating the name of the group. The group name may not be capable of uniquely identifying the group different from the group ID. The group name may be determined and changed in correspondence with a user operation with respect to the terminal device.

The member information may include a user ID of each user who belongs to the group. In addition, the upper limit of the number of users capable of belonging to the group may be determined (for example, 20 persons). Hereinafter, a user associated with the group in the information related to the group may also be referred to as a member of the group.

One or more users (administration users) belonging to the group may have a predetermined authority. For example, the administration users may have an authority of determining approval and disapproval for subscription to the group and approval and disapproval for withdrawing from the group with respect to other users.

In addition, the subscription group represents a group to which the first user subscribes, and also may include a friend group to which the first user passively subscribes in addition to a group such as a guild to which the first user actively and selectively subscribes as to be described later.

The relationship determination function 113 may determine whether or not a game medium associated with the first user and a game medium associated with a user belonging to a subscription group have a predetermined relationship (S140). With regard to the determination, for example, processing may be initiated when a user selects subscription to a target group, that is, the user ID may be associated with the group ID as a trigger.

First, with respect to all game media owned by the first user, the relationship determination function 113 specifies corresponding game media having a predetermined relationship. In addition, game media owned by all users belonging to the subscription group may be referenced and determination may be made as to whether or not the specified corresponding game medium may be included in the game media.

In addition, from a result of the determination by the relationship determination function 113, in a case where it may be determined that the game media have a predetermined relationship, the extraction function 102 can extract a user associated with the game medium having the predetermined relationship as the other user (S200). Finally, the extracted other user and a corresponding game medium of the other user may be stored in association with the first user and the game medium of the first user (S300), and then the subscription processing may be terminated. Furthermore, after the subscription processing, subscription group information and a notification thereof can be transmitted to the terminal device.

According to an exemplary embodiment of the game program which may be realized by the above-described configuration, cooperation with users in a group may become strong. Accordingly, it may be possible to prevent the users from withdrawing from the group of the user, and it may be possible to prevent the users from withdrawing from a game. In addition, since a user and a game medium may be automatically associated in correspondence with subscription to a group of the user, it may not be necessary for the user to perform a complicated operation of selecting the other users or a game medium owned by the other users, and thus usability may be improved.

Furthermore, as a case opposite to the subscription to a group, in a case where a user withdraws from the group, processing of specifying other users associated with the withdrawing user and of cancelling the association may be performed. The cancellation processing can be initiated when the user selects withdrawing from the group, that is, the association between the user ID and the group ID may be cancelled as a trigger.

In the processing, first, on the basis of information related to a game medium owned by the first user, among users belonging to the withdrawing group, other users associated with the first user and the game medium and a target game medium may be specified. In addition, finally, association between the specified other users and corresponding game medium, and the first user and the game medium of the first user may be cancelled, and then the cancellation processing may be terminated.

In addition, as illustrated in FIG. 6, the game program of the invention can further allow the computer to realize a group storage function 114, a group visualization function 115, and a group confirmation function 116. Hereinafter, each processing may be described with reference to a sequence diagram illustrated in FIG. 16. However, FIG. 16 may illustrate processing of the server device, according to an exemplary embodiment, and processing of the terminal device related to transfer of information with the server device, and it may not be intended to exclude execution of various kinds of processing not illustrated in the drawing in the server device and the terminal device.

The group storage function 114 may store a user and the name of a group to which the user belongs in the storage unit in association with each other (S150).

It may be assumed that the group stated here represents a group such as a guild that may be actively selected by the user for subscription, and the like.

The group visualization function 115 may generate information for displaying a list of group names stored in the storage unit on a display screen of a terminal of the first user in a manner capable of being selected (S160).

The group confirmation function 116 accepts selection of at least one subscription group by the first user among a plurality of groups displayed by the group visualization function (S170). The subscription group storage function 112 associates the user ID with the group ID when the selection may be accepted as a trigger, and can store the first user and the subscription group in the storage unit in association with each other. Details of the subscription processing may be as described above.

In addition, in a case where the first user withdraws from a belonging group, the extracted user storage function 103 can cancel association between the first user and the other users associated with the first user, and can store the first user and the other users in the storage unit. The cancellation processing can be initiated when the user selects withdrawing from the group, that is, association between the user ID and the group ID may be cancelled as a trigger. Details of the cancellation processing may be as described above.

Figure 9:
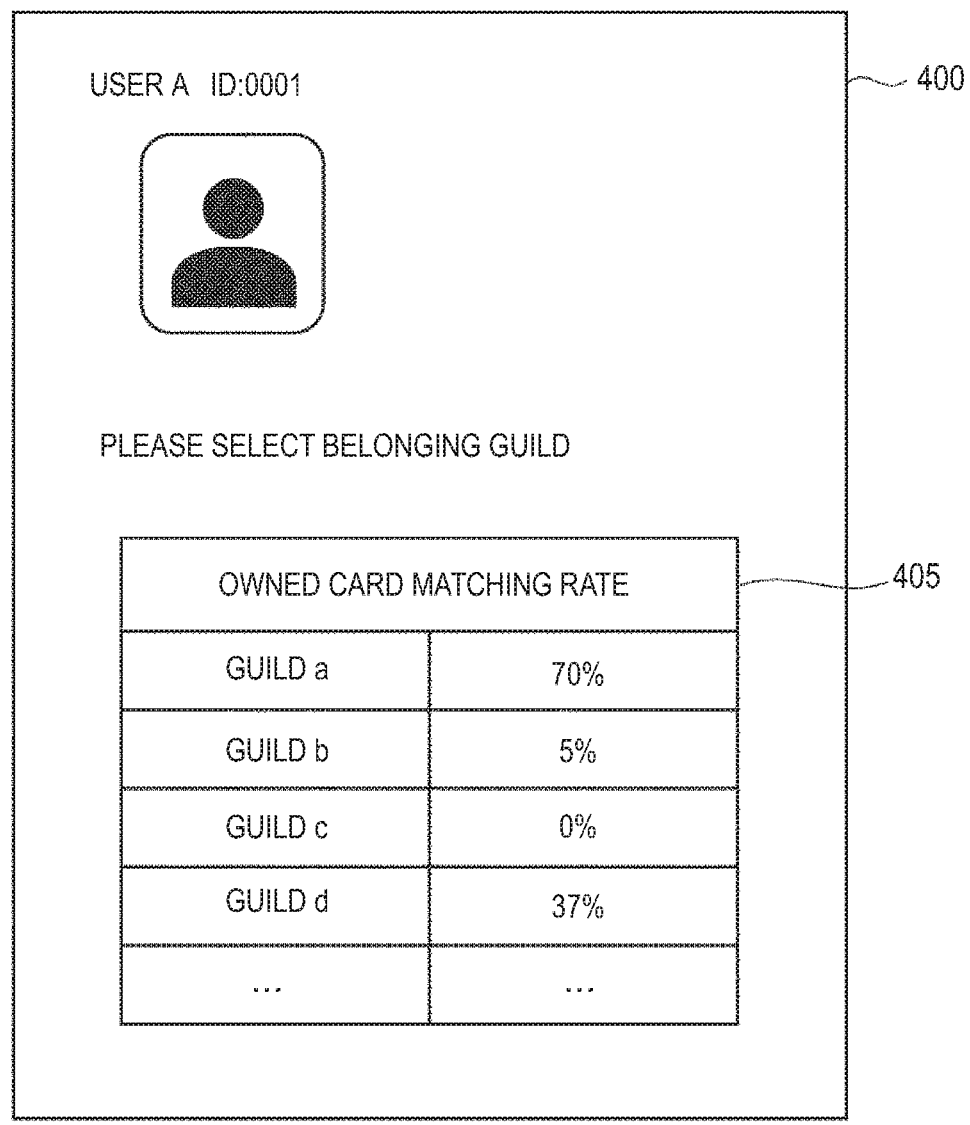
FIG. 9 is an image view illustrating an example of the display screen of the game that may be realized by the game program of the invention.

In addition, as illustrated in FIG. 9, when a user subscribes to a group, the group visualization function 115 can generate information for displaying matching information 405 based on the number of the users who may be associated for every group. In the invention, the matching information 405 can be displayed as reference information that may be provided to the user before the user subscribes the group. The generation processing may be described below in detail.

First, with respect to all game media owned by the user, a corresponding game medium having a predetermined relationship may be specified. In addition, game media owned by all users in a group to which the user can subscribe may be referenced, and determination may be made as to whether or not the specified corresponding game medium may be included among the game media.

After the determination processing, the number of a plurality of the specified corresponding game media may be counted, and information based on the count number may be displayed as matching information for every group. For example, the matching information may be set as information indicating that the count number may become a certain ratio with respect to the number of game media owned by the user, or may be set as information simply indicating the count number. In addition, the matching information may be a value that may be derived by weighting the count number with parameters of the specified game medium. For example, the count number may be different in correspondence with a rarity value of the specified game medium. For example, SR may be counted as "3", R may be counted as "1", and a total number thereof may be set as the matching information.

According to the above-described configuration, the user can provide information capable of selecting a group advantageous for the user when subscribing to the group. That is, the user can preferentially select a group in which a possibility of variation of parameter values of a game medium owned by the user may be high when subscribing to the group.

In addition, in a case where one parameter value of the game medium associated with the first user fluctuates, the processing function 105 can allow another parameter value, which may be different from the one parameter value of the game medium, of the corresponding game medium to vary. Furthermore, with regard to a variation target, the target can be stored in accordance with association between the game medium and the corresponding game medium which may be performed in advance. In addition, the variation target may be determined automatically or in correspondence with selection by a user.

Figure 10:
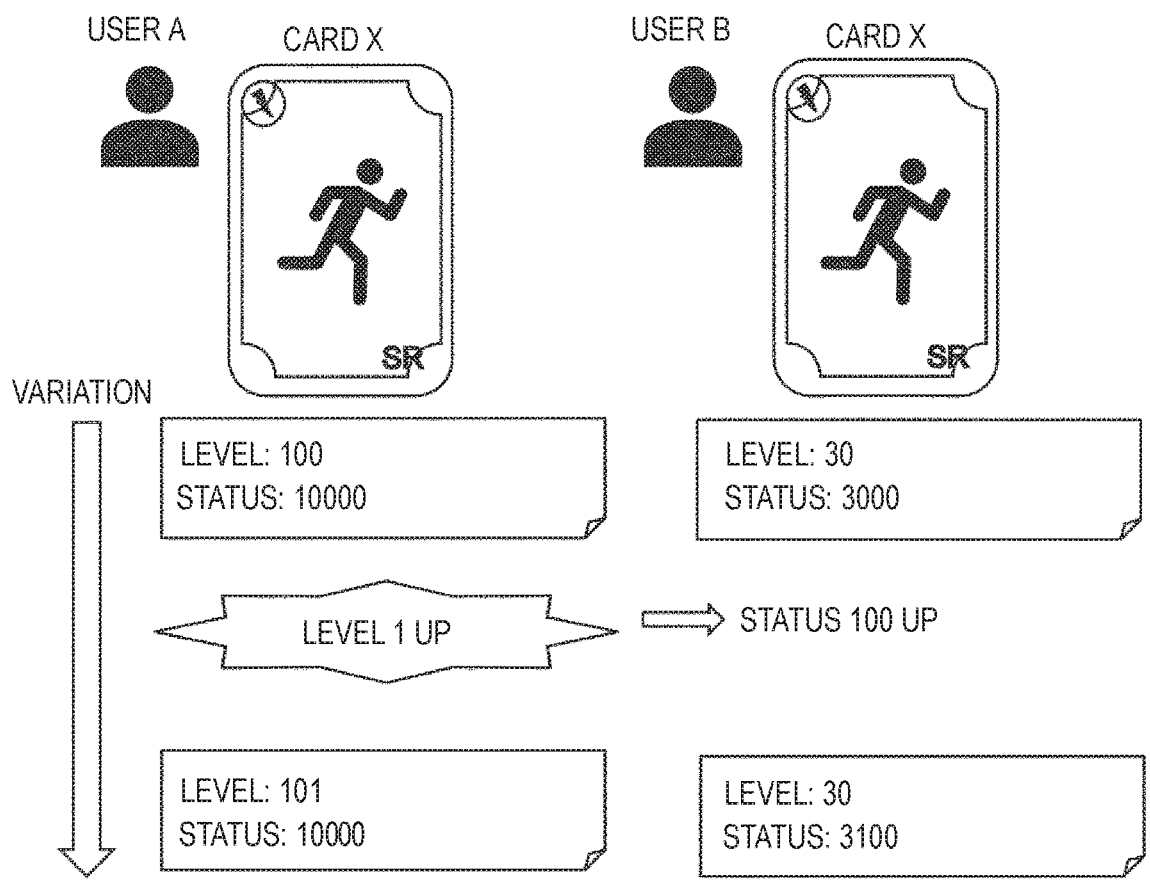
FIG. 10 is an image view illustrating processing of an exemplary embodiment of a processing function.
Figure 11:
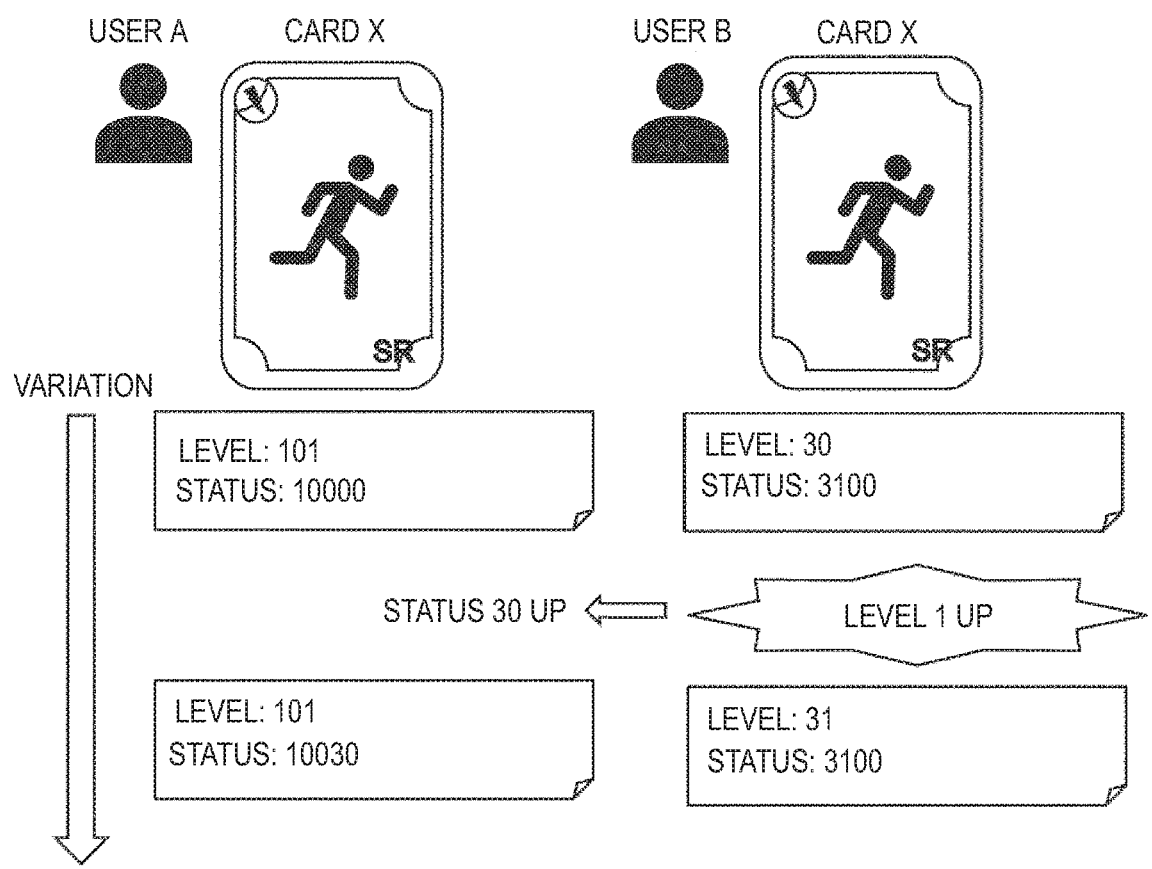
FIG. 11 is an image view illustrating processing of an exemplary embodiment of a processing function.

Specifically, as in images illustrated in FIG. 10 and FIG. 11, when a level of a card X of a user A may be raised up by "1", a status of a card X of a user B can rise up by "100". In a case where a level of the card X of the user B may rise up by "1", a status of the card X of the user A can rise up by "30".

In addition, the processing function 105 can automatically calculate a variation amount of the parameter value of the corresponding game medium on the basis of the parameter value of the game medium associated with the corresponding game medium.

Specifically, as in the images illustrated in FIG. 10 and FIG. 11, in a case where the level of the card X of the user A in a level of 100 may rise up by "1", the status of the card X of the user B can rise up by "100". In a case where the level of the card X of the user B in a level of 30 may rise up by "1", the status of the card X of the user A can rise up by "30". That is, a value obtained by multiplying the level of the card X by 1 can be automatically calculated and added to the status. However, a calculation formula may not be limited thereto, and can be appropriately set in consideration of game balance, and the like.

As a specific example of the calculation processing, for example, the variation amount may be set to a value obtained by multiplying the fluctuation amount by a predetermined value.

For example, the predetermined value can be set in correspondence with the degree of commonness between the corresponding game medium, and a game medium associated with the corresponding game medium. Specifically, for example, the predetermined value can be set to an arbitrary value so that as the degree of coincidence between game media is greater, the variation amount may become greater.

In addition, for example, the predetermined value can be set in correspondence with a relationship between users. Specifically, the predetermined value can be set to an arbitrary value so that the variation amount may increase, for example, in a case where the reason why users are associated with one another is because they are each associated as a "friend" or are part of "the same guild".

In addition, the predetermined value can be set, for example, in correspondence with a parameter value of one of the game medium and the corresponding game medium. Specifically, the predetermined value can be set to an arbitrary value so that the variation amount increases, for example, in a case where at least one of a parameter value of a game medium and a parameter value of a corresponding game medium associated with the game medium satisfies a predetermined condition. Specific examples of this case include a case where a parameter value of at least one side is lower than a setting value (for example, a level of 10 or a health point value of 100), and the like.

Alternatively, the predetermined value can be set, for example, in correspondence with a difference in a parameter value between the game medium and the corresponding game medium. Specifically, the predetermined value can be set to an arbitrary value so that the variation amount increases, for example, in a case where the difference in the parameter value between the game medium and the corresponding game medium satisfies a predetermined condition. Specific examples of this case include a case where the difference may be greater than a setting value (for example, a level difference may be 50, or the health point value may be 100), and the like.

As described above, when various conditions are set, it may be possible to enlarge an effect of a user corresponding to the conditions on a game medium of other users. As a result, with respect to the user corresponding to the conditions, it may be possible to raise a motivation to progress a game, and it may be possible to improve activity situation in a game. For example, description may be given of an example in which the variation amount with respect to the fluctuation amount may be set to increase in a case where a parameter value of a user or a parameter value of a game medium owned by the user may be low. Under the condition, in a beginner user whose user parameter value may be low or whose game medium has a low parameter value, in other words, a user who may be less experienced in a game, an effect on a game medium of other users may increase, and thus it may be possible to activate an activity situation of the beginner user. In addition, other users who desire to be associated with the beginner user increase, and a relationship between the beginner user and the other users may be constructed, and thus it may be possible to activate a game.

In addition, description may be given of an example in which the variation amount with respect to the fluctuation amount may be set to increase, for example, in a case where a difference in the parameter value between users or a difference in the parameter value between game media owned by the user may be greater. Under the condition, it may be possible to associate a beginner user whose user parameter value may be low or whose game medium has a low parameter value, in other words, a user who may be less experienced in a game, and a skilled user whose user parameter value may be high or whose game medium has a high parameter value, in other words, a skilled user who may be more experienced in a game. Typically, it may be possible to activate interaction between users who may otherwise rarely interact.

The processing function 105 can make a variation amount of the parameter value of the corresponding game medium be different between within a predetermined period after associating the first user and the game medium with each other and outside the predetermined period.

Specifically, for example, the variation amount of the parameter value of the corresponding game medium can be made be different so that it may be most advantageous for other users in a case where the other users own the corresponding game medium within a predetermined period. Setting of the period may raise a motivation of the other users to early acquire the corresponding game medium, and this may lead to activation of a game.

In this case, it may be assumed that information related to a period, and algorithms for deriving a variation amount with respect to a fluctuation value in the period, and a variation amount with respect to a fluctuation value outside the period may be stored in the storage unit in correlation with each game medium. In addition, in a case where the parameter value fluctuates, determination may be made as to whether or not time at which the fluctuation occurs may be within the period in addition to typical processing. In correspondence with a result of the determination, any one of an in-period algorithm and an out-of-period algorithm may be adapted, the variation amount may be determined on the basis of the adapted algorithm, and the parameter value of the corresponding game medium may be allowed to vary. For example, the following processing can be performed. Specifically, 2% of the fluctuation amount may become the variation amount within the period, and 1% of the fluctuation amount may become the variation amount outside the period.

The game program of the invention can further allow the computer to realize a game medium award function 117.

The game medium award function may determine whether or not the first user acquired a game medium. As described, for example, the first user can acquire a game medium as a reward of a quest in a game and the like.

In addition, in a case where the game medium award function may determine that the first user newly acquires the game medium, the game medium storage function can store the first user, the game medium, and the parameter value of the game medium in the storage unit in association with each other. Specifically, the user ID, the card ID, and the like may be stored in correlation with each other.

The game program of the invention can further allow the computer to realize a game medium removal function 118.

The game medium removal function 118 may determine whether or not the first user discarded a game medium. The first user can discard the game medium by abandoning, selling, or consuming the game medium.

In addition, in a case where the game medium removal function 118 may determine that the first user discarded the game medium, the game medium storage function can cancel the association between the first user, the game medium, and the parameter value of the game medium which may be stored in the storage unit. Specifically, correlation between a user ID and an owned game medium can be cancelled.

As illustrated in FIG. 6, the game program of the invention can further allow the computer to realize a notification formulation function 119.

The notification formulation function 119 may generate information for displaying a notification, which indicates that a parameter value may vary, on a display screen of other users who may be associated with a corresponding game medium of which a parameter value varied by the processing function 105 (S700). The notification and storage update processing in the terminal device can be performed simultaneously, or the notification can be given after performing the storage update processing.

The notification formulation function 119 can generate the information so that information related to processing, in which the parameter value varied by the notification, may be included in the notification.

Examples of the information related to the processing in which the parameter value may vary by the notification include information related to the reason such things as the parameter value varied by which behavior, and the like. Examples of the information include information indicating that the parameter value varied due to a fluctuation of a level of the first user, information indicating that the level varied due to a fluctuation of the parameter value of the first user, and the like.

In addition, the notification formulation function 119 can perform display in the notification in such a manner that variation amounts of parameter values by a plurality of users associated with each other may be explicitly described, and the degrees of contribution of the plurality of users based on the variation amount of the parameter values can be compared and confirmed. Each of the degrees of contribution can be determined on the basis of each of the variation amounts of the parameter values. For example, the degree of contribution may be the variation amount of the parameter value by a user corresponding to the degree of contribution, or a ratio of the variation amount of the user corresponding to the degree of contribution with respect to variation amounts of all users. According to the above-described configuration, it may be possible to clearly understand an effect of users other than a host user, and cancellation of the association may be based on the configuration. Specifically, among users associated with the host user, association with a user whose degree of contribution is low may be cancelled, and thus it may be possible to make a countermeasure for emptying a frame with which the host user can be associated and associating a new user with the host user.

The notification formulation function 119 can display a notification, which indicates that the first user and the game medium may be associated with each other, with respect to additional users who may not be associated with a corresponding game medium that may be a game medium having a predetermined relationship with the newly acquired game medium, and/or other users who may be associated with the corresponding game medium that may be a game medium having a predetermined relationship with the newly acquired game medium.

The notification formulation function 119 can display a notification, which indicates that the association between the first user and the game medium may be cancelled, with respect to other users associated with a corresponding game medium that may be a game medium having a predetermined relationship with the discarded game medium.

According to the above-described configuration, an additional user can understand that the first user may own which game medium, and thus it may be possible to raise a motivation of the additional user to acquire the corresponding game medium, and this may lead to activation of a game. In addition, other users can understand that the first user may own a game medium having a predetermined relationship with a game medium owned by the other users, and thus the other users can understand a possibility of strengthening of the game medium owned by the other users. Accordingly, it may be possible to raise a motivation to play a game, and this may lead to activation of the game. In addition, the other users can understand that the first user does not own a game medium having a predetermined relationship a corresponding game medium. Accordingly, it may be possible to raise a motivation to acquire a new corresponding game medium, and this may lead to activation of a game.

Figure 12:
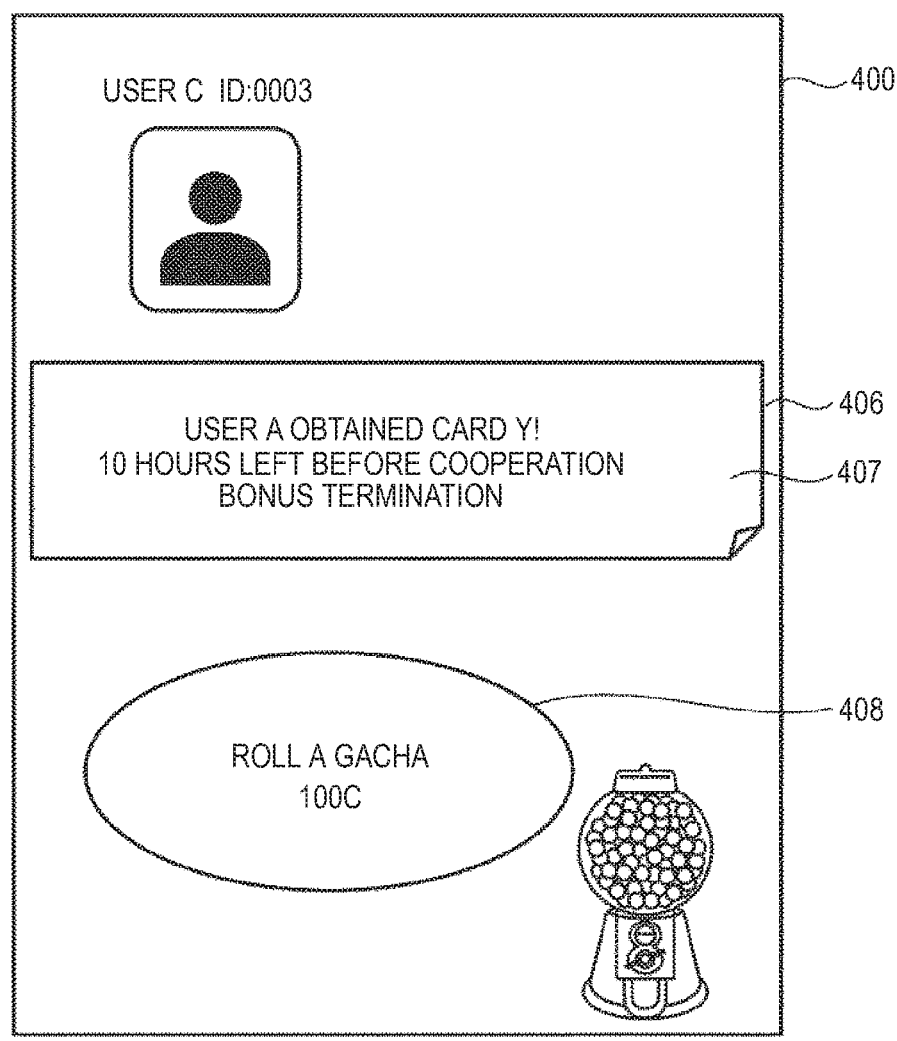
FIG. 12 is an image view illustrating an example of the display screen of the game that may be realized by an exemplary embodiment of a game program.

FIG. 12 may be a view illustrating the display screen 400 of a game that may be realized by the game program of the invention. As illustrated in FIG. 12, a notification 406, which indicates association between the first user and a game medium, may be displayed on the display screen 400. In the example illustrated in FIG. 12, display 407 of a period in which the selection of other users by the first user may be possible, and a button 408 with which the other users acquire a corresponding game medium can be additionally displayed.

Figure 13:
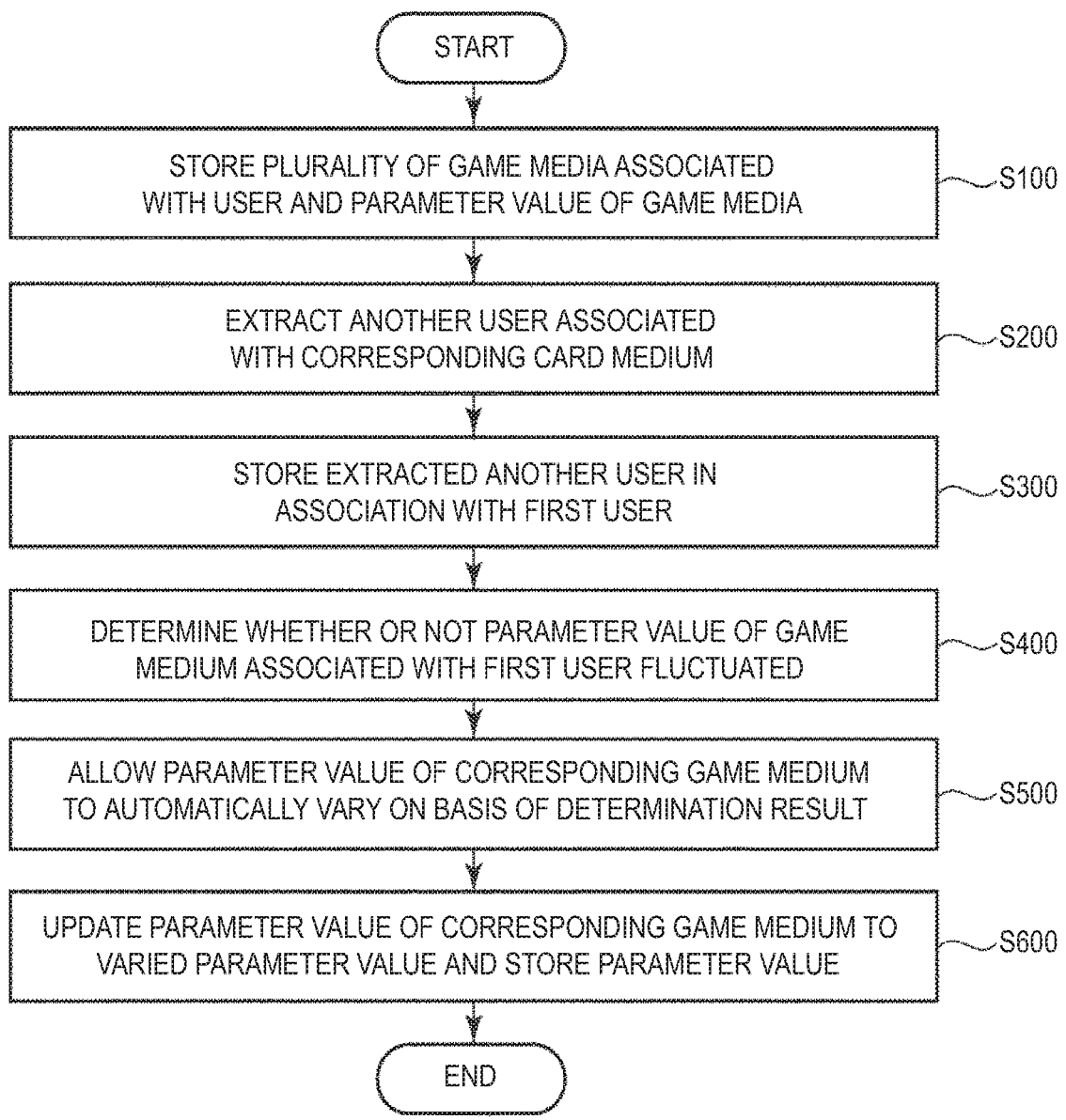
FIG. 13 is a flowchart illustrating an example of a flow of an exemplary embodiment of a game processing method.

Next, the game processing method of the invention may be described with reference to the accompanying drawings. FIG. 13 may be a flowchart illustrating an example of the game processing method of the invention. As illustrated in FIG. 13, the game processing method of the invention may allow a computer to execute a game medium storage step S100, an extraction step S200, an extracted user storage step S300, a fluctuation determination step S400, a processing step S500, and a parameter value storage step S600.

In the game medium storage step S100, a plurality of game media associated with a user, and parameter values of the game media may be stored in a storage unit. The game medium storage step S100 can be realized by allowing the computer to execute the above-described game medium storage function 101.

In the extraction step S200, other users associated with a corresponding game medium that may be a game medium having a predetermined relationship with a game medium stored in the storage unit in association with a first user may be extracted. The extraction step S200 can be realized by allowing the computer to execute the above-described extraction function 102.

In the extracted user storage step S300, the other users extracted in the extraction step S200 in the storage unit in association with the first user may be stored in the storage unit. The extracted user storage step S300 can be realized by allowing a computer to execute the above-described extracted user storage function 103.

In the fluctuation determination step S400, determination may be made as to whether or not a parameter value of the game medium associated with the first user fluctuates. The fluctuation determination step S400 can be realized by allowing the computer to execute the above-described fluctuation determination function 104.

In the processing step S500, the parameter value of the corresponding game medium may be allowed to automatically vary on the basis of a determination result in the fluctuation determination step S400. The processing step S500 can be realized by allowing the computer to execute the above-described processing function 105.

In the parameter value storage step S600, the parameter value of the corresponding game medium may be updated to a parameter value that varied in the processing step S500, and of storing the resultant parameter value in the storage unit. The parameter value storage step S600 can be realized by allowing the computer to execute the above-described parameter value storage function 106.

According to an exemplary embodiment of the game processing method which may be realized by the above-described configuration, it may be possible to realize a game capable of allowing users to continuously play a game as contemplated and set forth herein by allowing users to cooperate with each other on the basis of owned game media.

Figure 14:
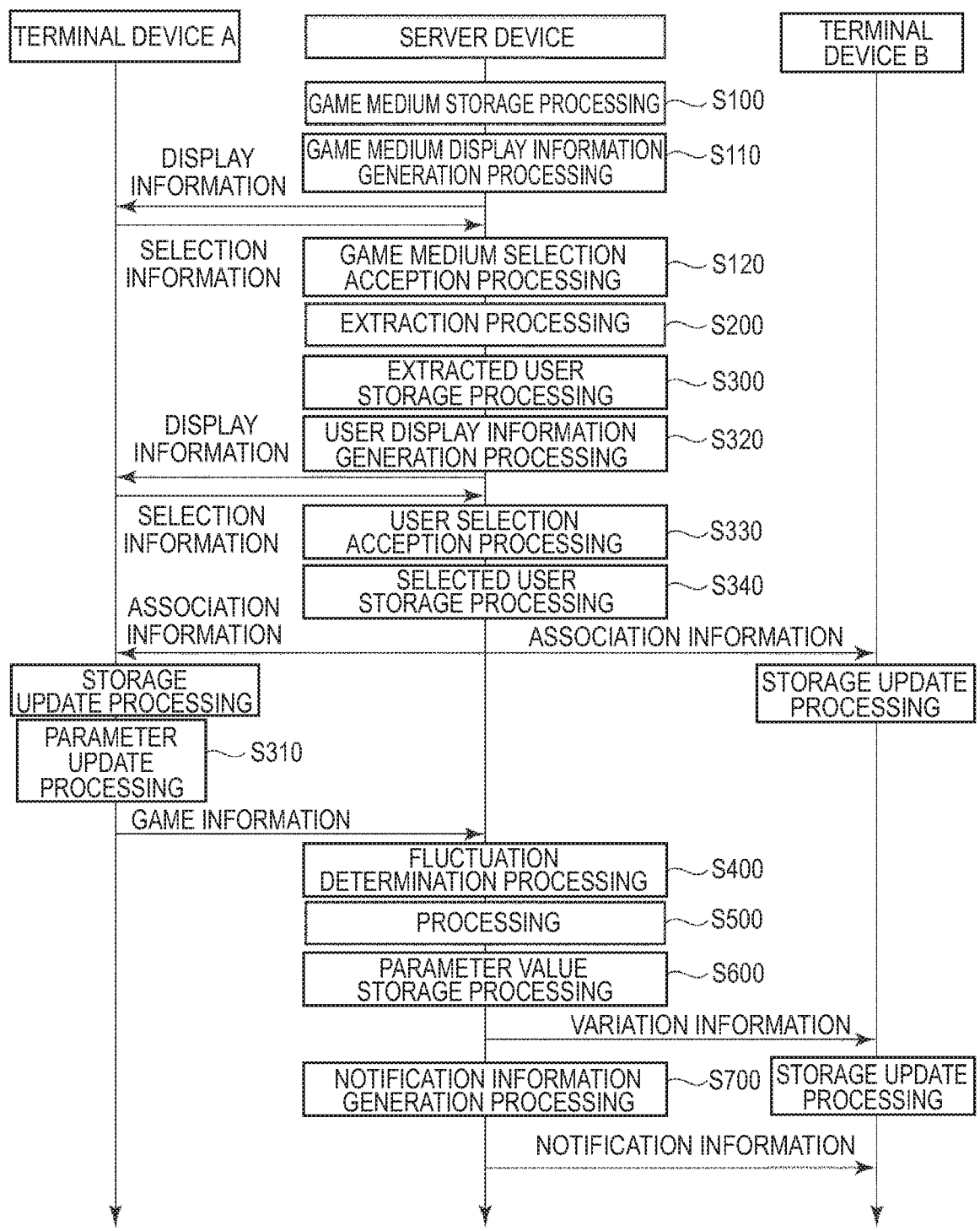
FIG. 14 is a sequence diagram illustrating an example of a processing sequence of each embodiment of an exemplary embodiment of a game processing method.
Figure 15:
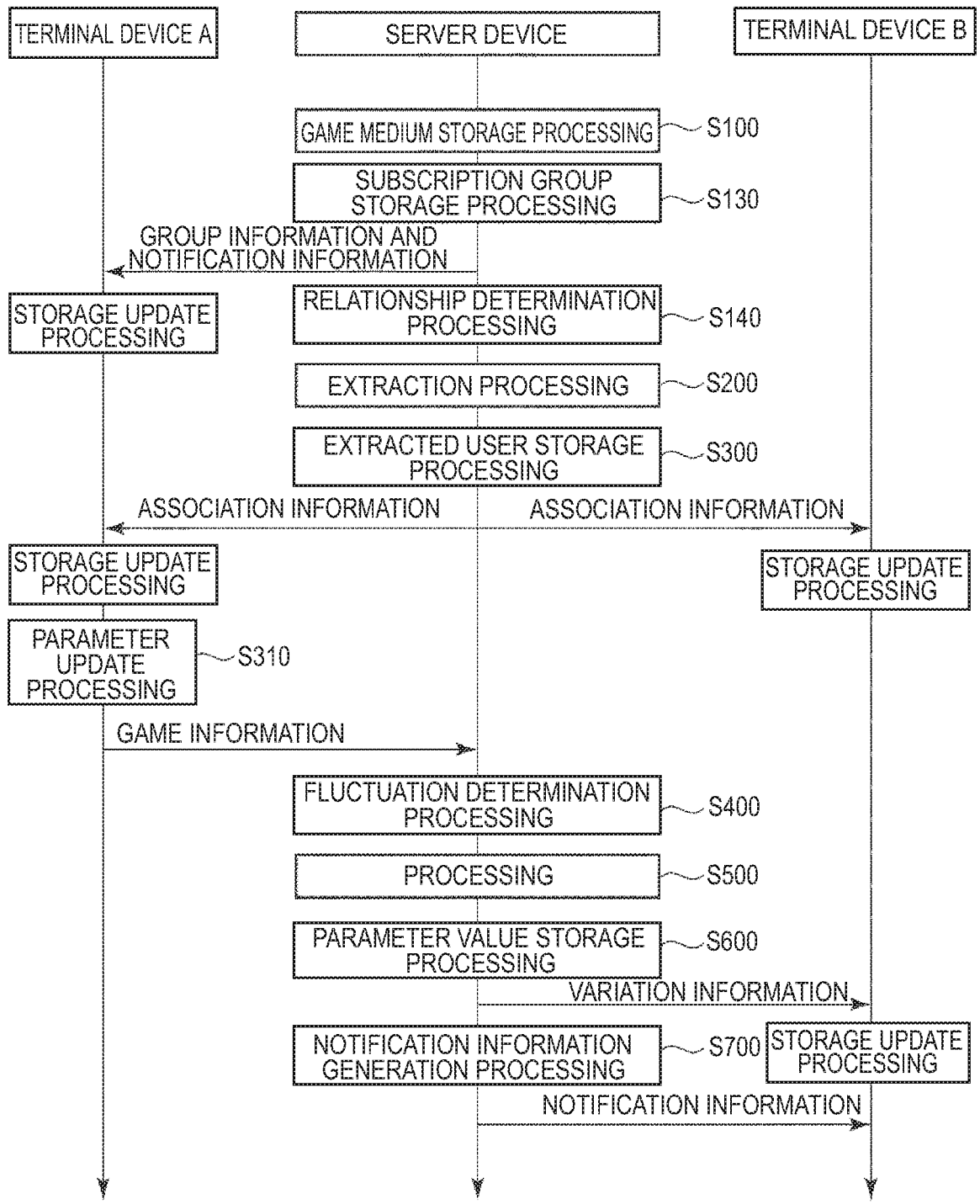
FIG. 15 is a sequence diagram illustrating an example of the processing sequence of each exemplary embodiment of the game processing method.
Figure 16:
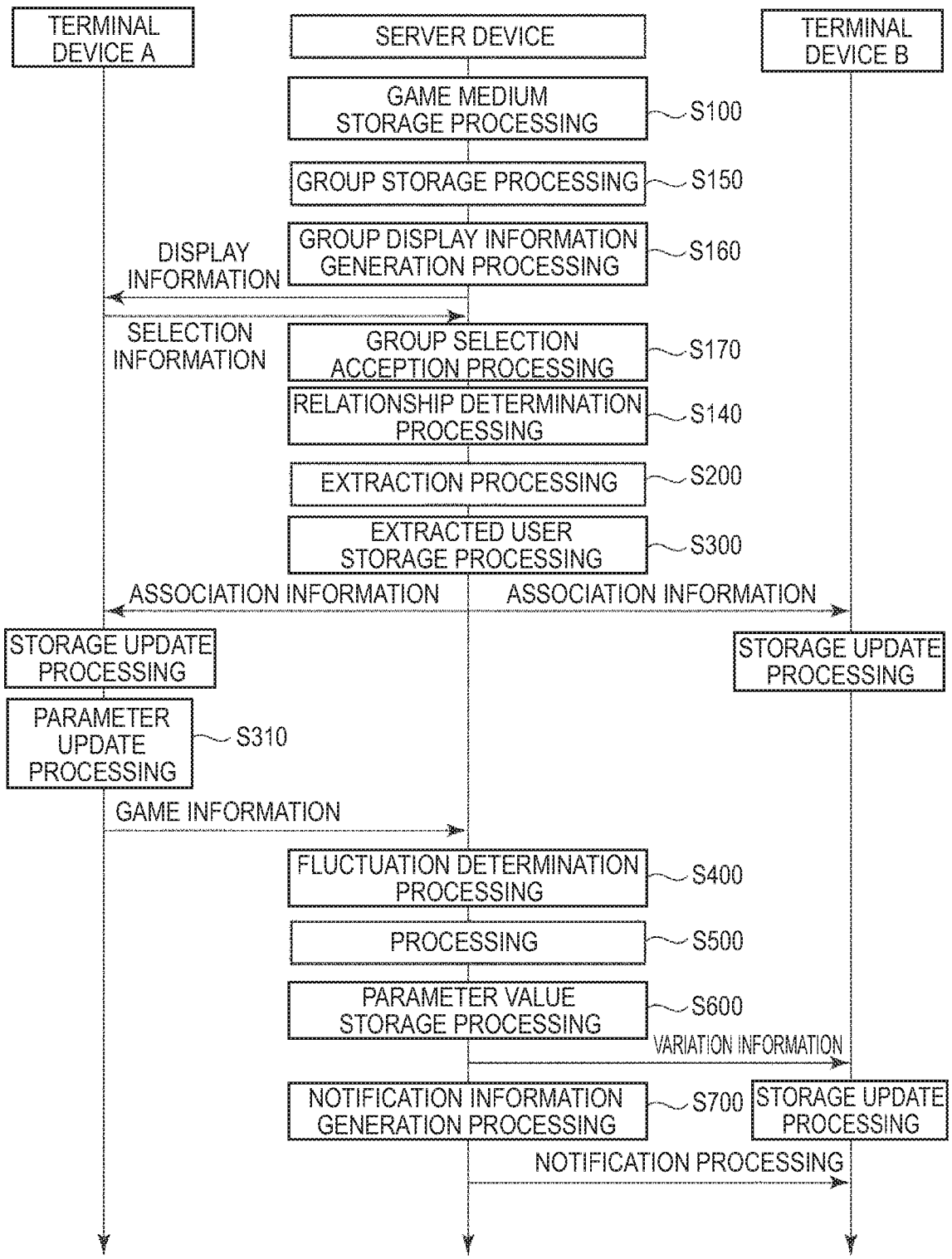
FIG. 16 is a sequence diagram illustrating an example of the processing sequence of each exemplary embodiment of the game processing method.

FIG. 14 to FIG. 16 which are referenced in the above-description may be views illustrating a process sequence of each embodiment of the above-described game processing method. Here, description has been given of an example in which main processing may be performed by the server device, but the processing may be executed by the terminal processing unit of the terminal device. In this case, when various pieces of information such as a user table, a card table, and a selection table may be stored in the terminal storage unit, it may not be necessary to perform communication with a server whenever performing processing, and the above-described functions can be realized by only the terminal device. In addition, a game executed in the terminal device may be a hybrid game in which the server and the terminal device partially take charge of the processing of the game. In this case, for example, each screen related to the progress of a game may be set as a web display in which the screen may be displayed on the terminal device on the basis of display data generated by the server, and other menu screens and the like can be set as a native display in which the menu screens and the like may be displayed by a native application installed in the terminal device.

Finally, the information processing device of the invention may be described with reference to the accompanying drawings.

Figure 17:
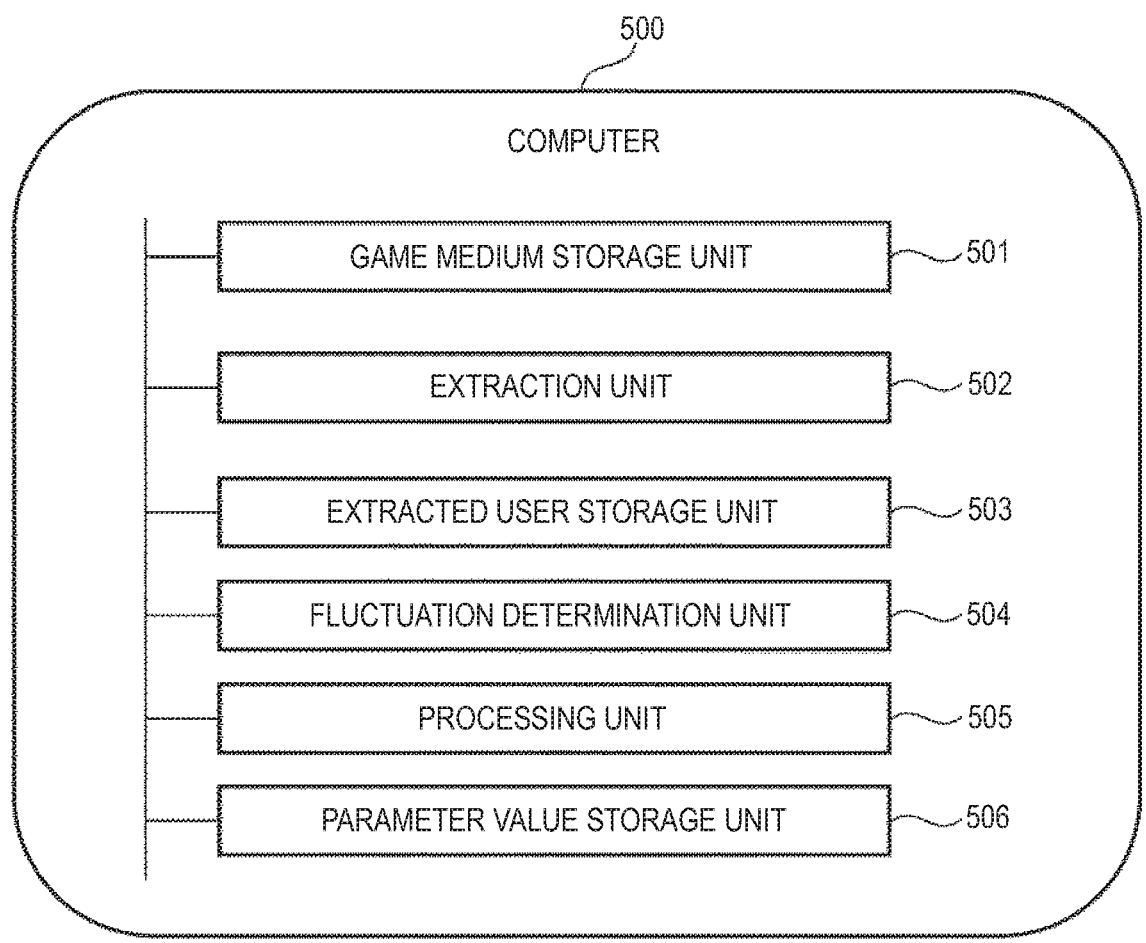
FIG. 17 is a configuration diagram illustrating an example of a configuration of an exemplary embodiment of an information processing device.

FIG. 17 may be a configuration diagram illustrating an example of a configuration of the information processing device of the invention. As illustrated in FIG. 17, an information processing device 500 of the invention may include a game medium storage unit 501, an extraction unit 502, an extracted user storage unit 503, a fluctuation determination unit 504, a processing unit 505, and a parameter value storage unit 506.

The game medium storage unit 501 may store a plurality of game media associated with a user, and parameter values of the game media. The game medium storage unit 501 can be configured to realize the above-described game medium storage function 101.

The extraction unit 502 may extract other users associated with a corresponding game medium that may be a game medium having a predetermined relationship with a game medium stored in the storage unit in association with a first user. The extraction unit 502 can be configured to realize the above-described extraction function 102.

The extracted user storage unit 503 may store the other users extracted by the extraction unit 502 in the storage unit in association with the first user. The extracted user storage unit 503 can be configured to realize the above-described extracted user storage function 103.

The fluctuation determination unit 504 may determine whether or not a parameter value of the game medium associated with the first user fluctuates. The fluctuation determination unit 504 can be configured to realize the above-described fluctuation determination function 104.

The processing unit 505 may allow the parameter value of the corresponding game medium to automatically vary on the basis of a determination result in the fluctuation determination unit 504. The processing unit 505 can be configured to realize the above-described processing function.

The parameter value storage unit 506 may update the parameter value of the corresponding game medium to a parameter value that varied in the processing unit 505, and may store the resultant parameter value in the storage unit. The parameter value storage unit 506 can be configured to realize the above-described parameter value storage function 104.

According to an exemplary embodiment of the information processing device which may be realized by the above-described configuration, it may be possible to realize a game capable of allowing users to continuously play a game as contemplated and disclosed herein by allowing users to cooperate with each other on the basis of owned game media.

In addition, an information processing device such as a computer and a portable telephone can be appropriately used to function as the server device or the terminal device according to the above-described embodiment. The information processing device can be realized by storing a program, which describes processing contents for realization of respective functions of the server device or the terminal device according to the embodiment, in a storage unit of the information processing device, and by reading out and executing the program by a CPU of the information processing device.

An example of certain representative embodiments has been described, but the invention may not be limited to the embodiment.

REFERENCE NUMBERS 100 terminal device
101 game medium storage function
102 extraction function
103 extracted user storage function
104 fluctuation determination function
105 processing function
106 parameter value storage function
107 game medium visualization function
108 game medium confirmation function
109 user visualization function
110 user confirmation function
111 selected user storage function
112 subscription group storage function
113 relationship determination function
114 group storage function
115 group visualization function
116 group confirmation function
117 game medium award function
118 game medium removal function
119 notification formulation function
200 server device
300 network
400 display screen
500 information processing device

The invention claimed is:

1. A non-transitory computer-readable medium embodying program code that, when executed, causes a computer to realize:

a game medium storage function comprising storing a plurality of game media in association with a first user, and parameter values of each of the plurality of game media stored in association with the first user, in a storage unit;

an extraction function comprising identifying, based on the plurality of game media stored in association with the first user, a corresponding game medium, and extracting, from the storage unit, one or more other users associated with the corresponding game medium, the corresponding game medium comprising a game medium having a predetermined relationship with a game medium in the plurality of game media stored in the storage unit in association with the first user;

an extracted user storage function comprising creating an association between the one or more other users extracted by the extraction function and the first user, and storing the one or more other users extracted by the extraction function in the storage unit in association with the first user;

a fluctuation determination function comprising determining whether or not a parameter value of the game medium associated with the first user fluctuates;

a processing function comprising receiving, from the fluctuation determination function, a determination result that the parameter value of the game medium associated with the first user has fluctuated, and automatically varying the parameter value of the corresponding game medium on the basis of the determination result by the fluctuation determination function; and a parameter value storage function comprising updating the parameter value of the corresponding game medium to an adjusted parameter value, the adjusted parameter value being varied by the processing function, and further comprising storing the resultant adjusted parameter value in the storage unit as a new parameter value of the corresponding game medium.

2. The non-transitory computer-readable medium according to claim 1, further causing the computer to realize:

a game medium visualization function comprising generating information for displaying a plurality of the game media, said game media stored in the storage unit in association with the first user, on a display screen of a terminal of the first user in a manner capable of being selected; and a game medium confirmation function comprising accepting selection of at least one game medium by the first user among the plurality of game media displayed on the display screen, wherein the extraction function extracts one or more other users associated with a corresponding game medium having a predetermined relationship with an accepted game medium that is accepted by the game medium confirmation function.

3. The non-transitory computer-readable medium according to claim 2, wherein the game medium visualization function generates information for displaying the plurality of game media on the display screen in such a manner that the first user is limited to making up to a predetermined number of selections when the first user is selecting the game medium.

4. The non-transitory computer-readable medium according to claim 1, further causing the computer to realize:

a user visualization function comprising generating information for displaying the other users extracted by the extraction function on a display screen of a terminal of the first user, the other users being displayed in such a manner as to be capable of being selected;

a user confirmation function comprising accepting selection of at least one other user by the first user among the other users displayed on the display screen; and a selected user storage function comprising storing the at least one other user who is selected and the first user in the storage unit in association with each other on the basis of selection that is accepted by the user confirmation function, wherein in a case where it is determined by the fluctuation determination function that the parameter value of the game medium associated with the first user fluctuates, the processing function varies only the parameter value of the corresponding game medium associated with the other user who is selected.

5. The non-transitory computer-readable medium according to claim 4, wherein the user visualization function generates information that is displayed on the display screen so that in selection of the other user by the first user, a limit is imposed such that the first user is limited to selecting a number that does not exceed a predetermined number of selections.

6. The non-transitory computer-readable medium according to claim 4, wherein the user visualization function generates information that is displayed on the display screen so that in selection of the other user by the first user, a limit is imposed such that the first user is limited to making the selection only within a predetermined period.

7. The non-transitory computer-readable medium according to claim 1, further causing the computer to realize:

a subscription group storage function comprising storing the first user and at least one subscription group in the storage unit in association with each other in correspondence with a game progress situation; and a relationship determination function comprising determining whether or not the game medium associated with the first user and a game medium associated with a user belonging to the at least one subscription group have a predetermined relationship, wherein in a case where it is determined by the relationship determination function that the game media have the predetermined relationship, the extraction function extracts a user associated with the game medium having the predetermined relationship as the other user.

8. The non-transitory computer-readable medium according to claim 7, further causing the computer to realize:

a group storage function comprising storing the user and a name of a group to which the user subscribes in the storage unit in association with each other;

a group visualization function comprising generating information for displaying a list of group names stored in the storage unit on a display screen of a terminal of the first user in such a manner that the group names in the list are selectable; and a group confirmation function comprising accepting selection of at least one of the subscription groups by the first user among a plurality of groups displayed by the group visualization function.

9. The non-transitory computer-readable medium according to claim 7, wherein in a case where the first user withdraws from a subscription group, the extracted user storage function cancels association between the first user and the other users associated with the first user, and stores the first user and the other users in the storage unit.

10. The non-transitory computer-readable medium according to claim 7, wherein the group visualization function generates information for displaying matching information, for each of the at least one subscription groups, based on the number of the other users who are associated with the user when the user subscribes to the group.

11. The non-transitory computer-readable medium according to claim 1, wherein in a case where one parameter value of the game medium associated with the first user fluctuates, the processing function varies another parameter value, which is different from the one parameter value of the game medium, of the corresponding game medium.

12. The non-transitory computer-readable medium according to claim 1,
wherein the processing function automatically calculates a variation amount of the parameter value of the corresponding game medium on the basis of a fluctuation amount of the parameter value of the game medium associated with the corresponding game medium.

13. The non-transitory computer-readable medium according to claim 1,
wherein the processing function is further configured to adjust a variation amount of the parameter value of the corresponding game medium to a first value within a predetermined period after associating the first user and the game medium with each other and to a second value outside the predetermined period.

14. The non-transitory computer-readable medium according to claim 1, further causing the computer to realize:
a game medium award function comprising determining whether or not the first user newly acquires a game medium,
wherein in a case where the game medium award function determines that the first user newly acquires the game medium, the game medium storage function stores the first user, the game medium, and the parameter value of the game medium in the storage unit in association with each other.

15. The non-transitory computer-readable medium according to claim 1, further causing the computer to realize:
a game medium removal function comprising determining whether or not the first user discarded the game medium,
wherein in a case where the game medium removal function determines that the first user discarded the game medium, the game medium storage function cancels the association between the first user, the game medium, and the parameter value of the game medium which are stored in the storage unit.

16. The non-transitory computer-readable medium according to claim 1, further causing the computer to realize:
a notification formulation function comprising generating information for displaying a notification, the notification indicating a variation of the parameter value, on a display screen of the other users associated with a corresponding game medium that has a parameter value varied by the processing function.

17. The non-transitory computer-readable medium according to claim 16,
wherein the notification formulation function generates information related to the processing in which the parameter value varies, and wherein said information is included in the notification.

18. The non-transitory computer-readable medium according to claim 16, further causing the computer to realize:
a game medium award function comprising determining whether or not the first user acquires a game medium,
wherein in a case where the game medium award function determines that the first user has newly acquired the game medium, the game medium storage function stores the first user, the game medium, and a parameter value of the game medium in the storage unit in association with each other, and
the notification formulation function displays a notification, which indicates that the first user and the game medium are associated with each other, with respect to at least one of:
additional users who are not associated with a related game medium, the related game medium comprising a corresponding game medium having a predetermined relationship with the newly acquired game medium, and
other users who are associated with the related game medium.

19. The non-transitory computer-readable medium according to claim 16, further causing the computer to realize:
a game medium removal function comprising determining whether or not the first user discarded a game medium,
wherein in a case where the game medium removal function determines that the first user discarded the game medium, the game medium storage function cancels association between the first user, the game medium, and a parameter value of the game medium which are stored in the storage unit, and
the notification formulation function displays a notification, the notification indicating that the association between the first user and the game medium is cancelled, with respect to other users associated with a predetermined relationship corresponding game medium comprising a game medium having a predetermined relationship with the discarded game medium.

20. A game processing method comprising executing, on a computer:
a game medium storage step comprising storing a plurality of game media in association with a first user, and parameter values of each of the plurality of game media stored in association with the first user, in a storage unit;
an extraction step comprising identifying, based on the plurality of game media stored in association with the first user, a corresponding game medium, and extracting, from the storage unit, one or more other users associated with the corresponding game medium, the corresponding game medium comprising a game medium having a predetermined relationship with a game medium in the plurality of game media stored in the storage unit in association with the first user;
an extracted user storage step comprising creating an association between the one or more other users extracted by the extraction function and the first user, and storing the one or more other users extracted in the extraction step in the storage unit in association with the first user;
a fluctuation determination step comprising determining whether or not a parameter value of the game medium associated with the first user fluctuates;
a processing step comprising receiving, from the fluctuation determination function, a determination result that the parameter value of the game medium associated with the first user has fluctuated, and automatically varying the parameter value of the corresponding game medium on the basis of the determination result in the fluctuation determination step; and
a parameter value storage step comprising updating the parameter value of the corresponding game medium to an adjusted parameter value, the adjusted parameter value being varied in the processing step, and further comprising storing the resultant parameter value in the storage unit as a new parameter value of the corresponding game medium.

21. An information processing device, comprising a processor and a storage unit, wherein:
the storage unit comprises a game medium storage unit that stores a plurality of game media in association with a first user, and parameter values of each of the plurality of game media stored in association with the first user;
the processor comprises an extraction unit that identifies, based on the plurality of game media stored in association with the first user, a corresponding game medium, and extracts, from the storage unit, one or more other users associated with the corresponding game medium, the corresponding game medium comprising a game medium having a predetermined relationship with a game medium in the plurality of game media stored in the storage unit in association with the first user;
the storage unit further comprises an extracted user storage unit that creates an association between the one or more other users extracted by the extraction function and the first user, and stores the one or more other users extracted by the extraction unit in the storage unit in association with the first user;
the processor further comprises a fluctuation determination unit that determines whether or not a parameter value of the game medium associated with the first user fluctuates;
the processor further comprises a processing unit that receives, from the fluctuation determination function, a determination result that the parameter value of the game medium associated with the first user has fluctuated, and automatically varies the parameter value of the corresponding game medium on the basis of the determination result in the fluctuation determination unit; and
the storage unit further comprises a parameter value storage unit that updates the parameter value of the corresponding game medium to an adjusted parameter value, the adjusted parameter value being varied in the processing unit, and stores the resultant parameter value in the storage unit as a new parameter value of the corresponding game medium.

* * * * *